US012640151B2

(12) United States Patent
Naik et al.

(10) Patent No.: US 12,640,151 B2
(45) Date of Patent: May 26, 2026

(54) VOICE CONTROL WITH CONTEXTUAL KEYWORDS

(71) Applicant: Apple Inc., Cupertino, CA (US)

(72) Inventors: Devang K. Naik, San Jose, CA (US); Madhu Chinthakunta, Saratoga, CA (US); Paul R. Dixon, Zurich (CH); Kumari Nishu, Santa Clara, CA (US); Harry J. Saddler, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 18/368,333

(22) Filed: Sep. 14, 2023

(65) Prior Publication Data

US 2024/0096321 A1     Mar. 21, 2024

Related U.S. Application Data

(60) Provisional application No. 63/434,425, filed on Dec. 21, 2022, provisional application No. 63/407,531, filed on Sep. 16, 2022.

(51) Int. Cl.
*G10L 15/22*       (2006.01)
*G10L 15/02*       (2006.01)
*G10L 15/18*       (2013.01)
(52) U.S. Cl.
CPC .............. *G10L 15/22* (2013.01); *G10L 15/02* (2013.01); *G10L 15/1815* (2013.01)
(58) Field of Classification Search
CPC ...... G10L 15/22; G10L 15/02; G10L 15/1815
See application file for complete search history.

(56) References Cited

U.S. PATENT DOCUMENTS

| | | | |
|---|---|---|---|
| 7,596,269 B2 | 9/2009 | King et al. | |
| 7,899,666 B2 | 3/2011 | Varone | |
| 7,899,720 B1 * | 3/2011 | Nesladek | G06Q 30/04 |
| | | | 340/517 |
| 8,798,995 B1 | 8/2014 | Edara | |
| 9,628,955 B1 | 4/2017 | Fleizach et al. | |
| 9,633,004 B2 | 4/2017 | Giuli et al. | |
| 9,633,660 B2 | 4/2017 | Haughay | |
| 9,633,674 B2 | 4/2017 | Sinha | |
| 9,668,121 B2 | 5/2017 | Naik et al. | |
| 9,679,570 B1 | 6/2017 | Edara | |

(Continued)

FOREIGN PATENT DOCUMENTS

| WO | 2012/160567 A1 | 11/2012 |
|---|---|---|
| WO | 2015/036817 A1 | 3/2015 |

OTHER PUBLICATIONS

Bell, Jason, "Machine Learning Hands-On for Developers and Technical Professionals", Wiley, Nov. 3, 2014, 82 pages.

(Continued)

*Primary Examiner* — Ibrahim Siddo
(74) *Attorney, Agent, or Firm* — YHE Law LLP

(57)       ABSTRACT

Systems and processes for operating an intelligent automated assistant are provided. In some embodiments, contextual data is obtained and used to select a set of keywords (e.g., words or phrases) for voice control of an electronic device. When a speech input is received by the electronic device, a determination is made whether the speech input includes any of the selected keywords. If the speech input does include a selected keyword, an action is performed in response.

42 Claims, 22 Drawing Sheets

(56) References Cited

U.S. PATENT DOCUMENTS

| 9,697,822 | B1 | 7/2017 | Naik et al. |
| 9,721,566 | B2 | 8/2017 | Newendorp et al. |
| 9,818,400 | B2 | 11/2017 | Paulik et al. |
| 9,858,925 | B2 | 1/2018 | Gruber et al. |
| 9,886,953 | B2 | 2/2018 | Lemay et al. |
| 9,922,642 | B2 | 3/2018 | Pitschel et al. |
| 9,966,065 | B2 | 5/2018 | Gruber et al. |
| 9,966,068 | B2 | 5/2018 | Cash et al. |
| 9,972,304 | B2 | 5/2018 | Paulik et al. |
| 9,986,419 | B2 | 5/2018 | Naik et al. |
| 10,049,663 | B2 | 8/2018 | Orr et al. |
| 10,049,668 | B2 | 8/2018 | Huang et al. |
| 10,074,360 | B2 | 9/2018 | Kim |
| 10,078,487 | B2 | 9/2018 | Gruber et al. |
| 10,083,688 | B2 | 9/2018 | Piernot et al. |
| 10,083,690 | B2 | 9/2018 | Giuli et al. |
| 10,089,072 | B2 | 10/2018 | Piersol et al. |
| 10,102,359 | B2 | 10/2018 | Cheyer |
| 10,169,329 | B2 | 1/2019 | Futrell et al. |
| 10,170,123 | B2 | 1/2019 | Orr et al. |
| 10,176,167 | B2 | 1/2019 | Evermann |
| 10,185,542 | B2 | 1/2019 | Carson et al. |
| 10,186,254 | B2 | 1/2019 | Williams et al. |
| 10,192,552 | B2 | 1/2019 | Raitio et al. |
| 10,199,051 | B2 | 2/2019 | Binder et al. |
| 10,223,066 | B2 | 3/2019 | Martel et al. |
| 10,241,644 | B2 | 3/2019 | Gruber et al. |
| 10,249,300 | B2 | 4/2019 | Booker et al. |
| 10,269,345 | B2 | 4/2019 | Castillo Sanchez et al. |
| 10,276,170 | B2 | 4/2019 | Gruber et al. |
| 10,296,160 | B2 | 5/2019 | Shah et al. |
| 10,297,253 | B2 | 5/2019 | Walker, II et al. |
| 10,311,871 | B2 | 6/2019 | Newendorp et al. |
| 10,417,037 | B2 | 9/2019 | Gruber et al. |
| 10,475,446 | B2 | 11/2019 | Gruber et al. |
| 10,497,365 | B2 | 12/2019 | Gruber et al. |
| 10,540,976 | B2 | 1/2020 | Van Os et al. |
| 10,568,032 | B2 | 2/2020 | Freeman et al. |
| 10,659,851 | B2 | 5/2020 | Lister et al. |
| 10,671,428 | B2 | 6/2020 | Zeitlin |
| 10,706,841 | B2 | 7/2020 | Gruber et al. |
| 10,748,529 | B1 | 8/2020 | Milden |
| 10,791,176 | B2 | 9/2020 | Phipps et al. |
| 10,978,090 | B2 | 4/2021 | Binder et al. |
| 11,038,934 | B1 | 6/2021 | Hansen et al. |
| 11,080,336 | B2 | 8/2021 | Van Dusen |
| 11,133,008 | B2 | 9/2021 | Piernot et al. |
| 11,151,899 | B2 | 10/2021 | Pitschel et al. |
| 11,217,255 | B2 | 1/2022 | Kim et al. |
| 2004/0117191 | A1 | 6/2004 | Seshadri |
| 2008/0133235 | A1 | 6/2008 | Simoneau et al. |
| 2013/0006572 | A1 | 1/2013 | Hayner |
| 2014/0163751 | A1 | 6/2014 | Davis et al. |
| 2014/0337036 | A1 | 11/2014 | Haiut et al. |
| 2015/0199965 | A1 | 7/2015 | Leak et al. |
| 2015/0302847 | A1 | 10/2015 | Yun et al. |
| 2016/0314792 | A1 | 10/2016 | Alvarez et al. |
| 2017/0316779 | A1 | 11/2017 | Mohapatra et al. |
| 2021/0125609 | A1 | 4/2021 | Dusan et al. |
| 2022/0101827 | A1* | 3/2022 | Chang ............ G10L 15/02 |
| 2022/0172727 | A1 | 6/2022 | Sharifi et al. |

OTHER PUBLICATIONS

Bocchieri et al., "Use of Geographical Meta-Data in ASR Language and Acoustic Models", IEEE International Conference on Acoustics Speech and Signal Processing, 2010, pp. 5118-5121.

Cambria et al., "Jumping NLP curves: A review of natural language processing research.", IEEE Computational Intelligence magazine, 2014, vol. 9, May 2014, pp. 48-57.

Coulouris et al., "Distributed Systems: Concepts and Design (Fifth Edition)", Addison-Wesley, May 7, 2011, 391 pages.

Jefford et al., "Professional BizTalk Server 2006", Wrox, May 7, 2007, 398 pages.

Michalevsky et al., "Gyrophone: Recognizing Speech from Gyroscope Signals", Proceedings of the 23rd USENIX Security Symposium, Aug. 20-22, 2014, pp. 1053-1067.

Nakamura, Satoshi, "Overcoming the Language Barrier with Speech Translation Technology", Science & Technology Trends, Quarterly Review No. 31, Apr. 2009, pp. 36-49.

"Nuance Dragon Naturally Speaking, Version 13 End-User Workbook, Nuance Communications, Inc.", Online Available at:https://www.nuance.com/content/dam/nuance/en_us/collateral/dragon/guide/gd-dragon-naturally-speaking-13-workbook-en-us.pdf, Sep. 2014, 125 pages.

Phoenix Solutions, Inc., "Declaration of Christopher Schmandt Regarding the MIT Galaxy System", West Interactive Corp., a Delaware Corporation, Document 40, Jul. 2, 2010, 162 pages.

Qian et al., "Single-channel Multi-talker Speech Recognition With Permutation Invariant Training", Speech Communication, Issue 104, 2018, pp. 1-11.

Rowland et al., "Designing Connected Products: UX for the Consumer Internet of Things", O'Reilly, May 31, 2015, 452 pages.

Samsung, "SGH-a885 Series—Portable Quad-Band Mobile Phone-User Manual", Retrieved from the Internet: URL: http://web.archive.org/web/20100106113758/http://www.comparecellular.com/images/phones/userguide1896.pdf, Jan. 1, 2009, 144 pages.

Seroter et al., "SOA Patterns with BizTalk Server 2013 and Microsoft Azure", Second Edition, Packt Publishing, Jun. 30, 2015, 454 pages.

Stent et al., "Geo-Centric Language Models for Local Business Voice Search", AT&T Labs—Research, 2009, pp. 389-396.

Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.

Zheng et al., "Intent Detection and Semantic Parsing for Navigation Dialogue Language Processing", 2017 IEEE 20th International Conference on Intelligent Transportation Systems (ITSC), 2017, 6 pages.

Zhong et al., "JustSpeak: Enabling Universal Voice Control on Android", W4A'14, Proceedings of the 11th Web for All Conference, No. 36, Apr. 7-9, 2014, 8 pages.

* cited by examiner

Portable Multifunction Device 200

306     310     312

Speaker 211     Optical Sensor 264     Proximity Sensor 266

300

310 is SIM card slot
312 is headphone jack

302

Touch Screen 212

Contact Intensity Sensor(s) 265

Tactile Output Generator(s) 267

303

Microphone 213     Home 304     Accelerometer(s) 268

External Port 224

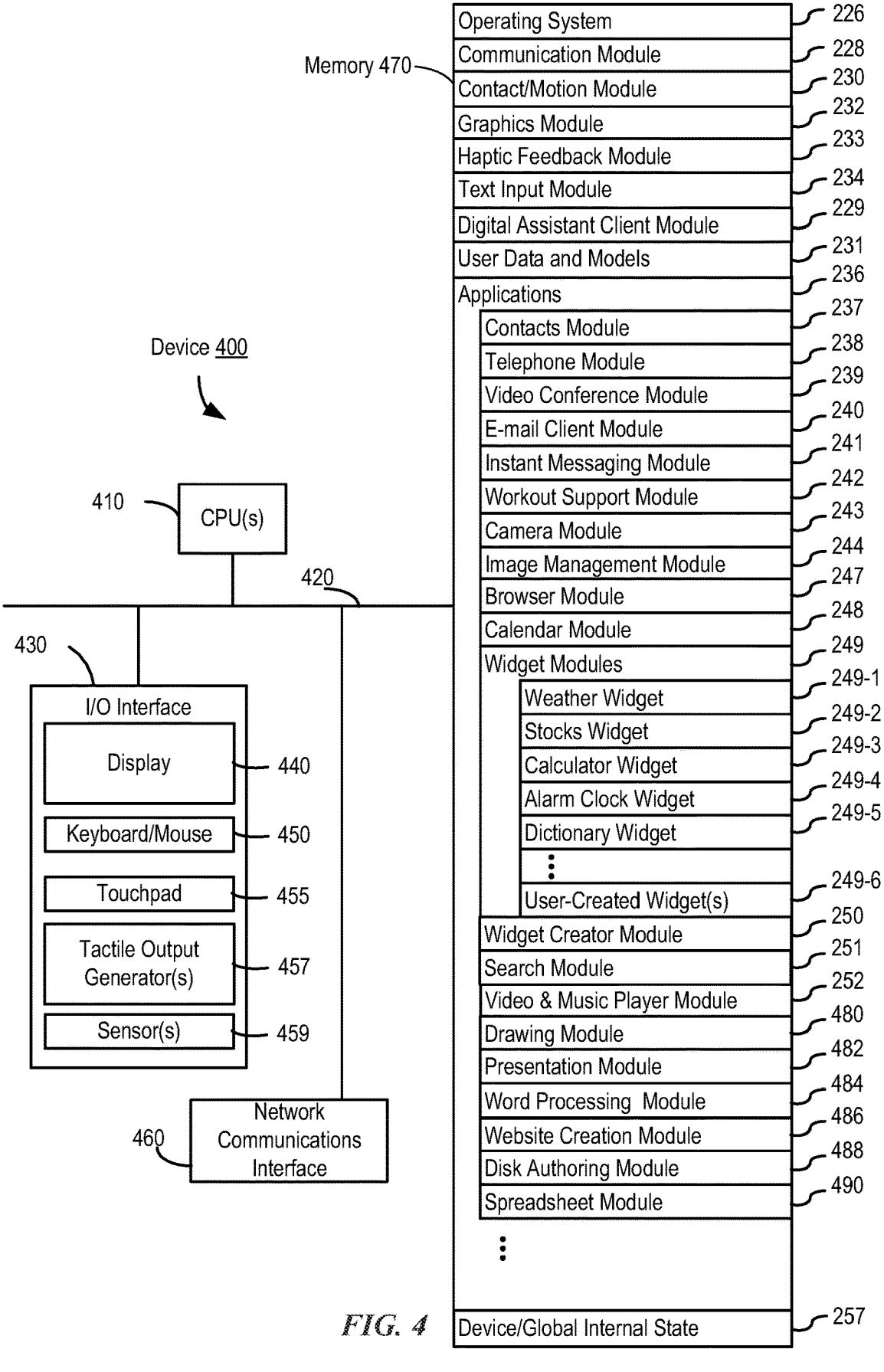

Device 400

410 — CPU(s)

420

430

I/O Interface

Display — 440

Keyboard/Mouse — 450

Touchpad — 455

Tactile Output Generator(s) — 457

Sensor(s) — 459

460 — Network Communications Interface

Memory 470

| Operating System | 226 |
| Communication Module | 228 |
| Contact/Motion Module | 230 |
| Graphics Module | 232 |
| Haptic Feedback Module | 233 |
| Text Input Module | 234 |
| Digital Assistant Client Module | 229 |
| User Data and Models | 231 |
| Applications | 236 |

| Contacts Module | 237 |
| Telephone Module | 238 |
| Video Conference Module | 239 |
| E-mail Client Module | 240 |
| Instant Messaging Module | 241 |
| Workout Support Module | 242 |
| Camera Module | 243 |
| Image Management Module | 244 |
| Browser Module | 247 |
| Calendar Module | 248 |
| Widget Modules | 249 |

| Weather Widget | 249-1 |
| Stocks Widget | 249-2 |
| Calculator Widget | 249-3 |
| Alarm Clock Widget | 249-4 |
| Dictionary Widget | 249-5 |
| ⋮ | |
| User-Created Widget(s) | 249-6 |

| Widget Creator Module | 250 |
| Search Module | 251 |
| Video & Music Player Module | 252 |
| Drawing Module | 480 |
| Presentation Module | 482 |
| Word Processing  Module | 484 |
| Website Creation Module | 486 |
| Disk Authoring Module | 488 |
| Spreadsheet Module | 490 |

⋮

| Device/Global Internal State | 257 |

*FIG. 4*

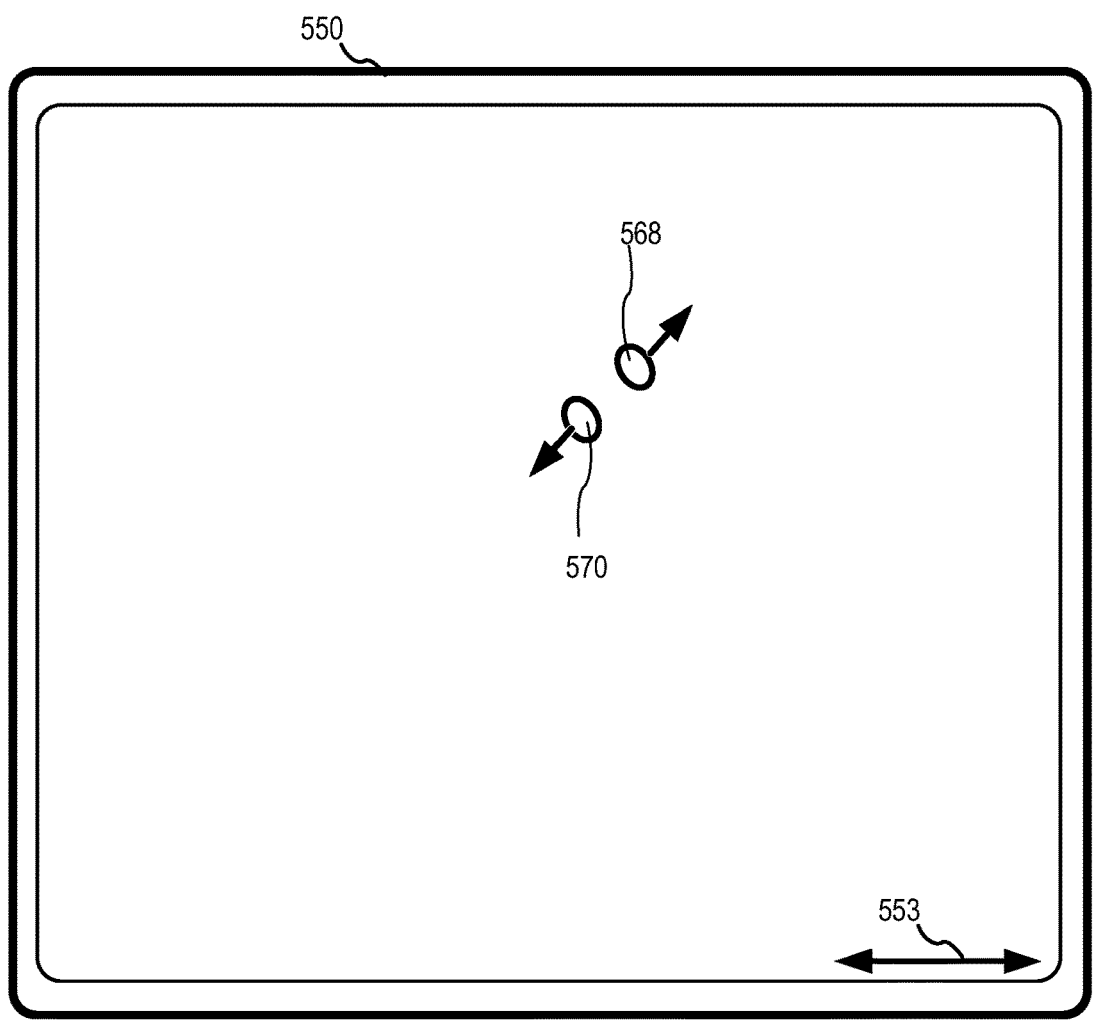
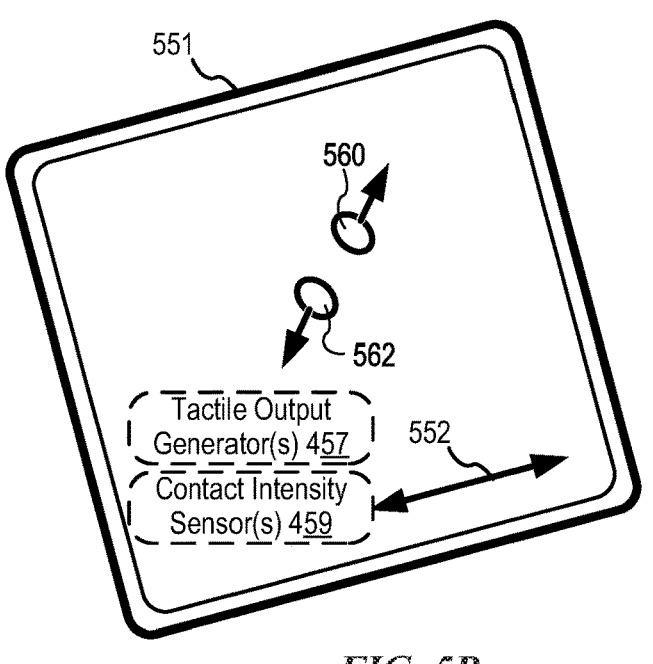
*FIG. 5B*

Digital Assistant System
700

900

B

916 — OBTAIN SECOND CONTEXTUAL INFORMATION

918 — SELECT A SECOND SET OF ONE MORE KEYWORDS, DIFFERENT FROM THE FIRST SET OF KEYWORDS, BASED ON THE SECOND CONTEXTUAL INFORMATION

920 — RECEIVE A SECOND SPEECH INPUT

922 — DETERMINE WHETHER THE SECOND SPEECH INPUT INCLUDES AT LEAST ONE KEYWORD OF THE SECOND SET OF ONE OR MORE KEYWORDS

YES

924 — PERFORM A SECOND ACTION

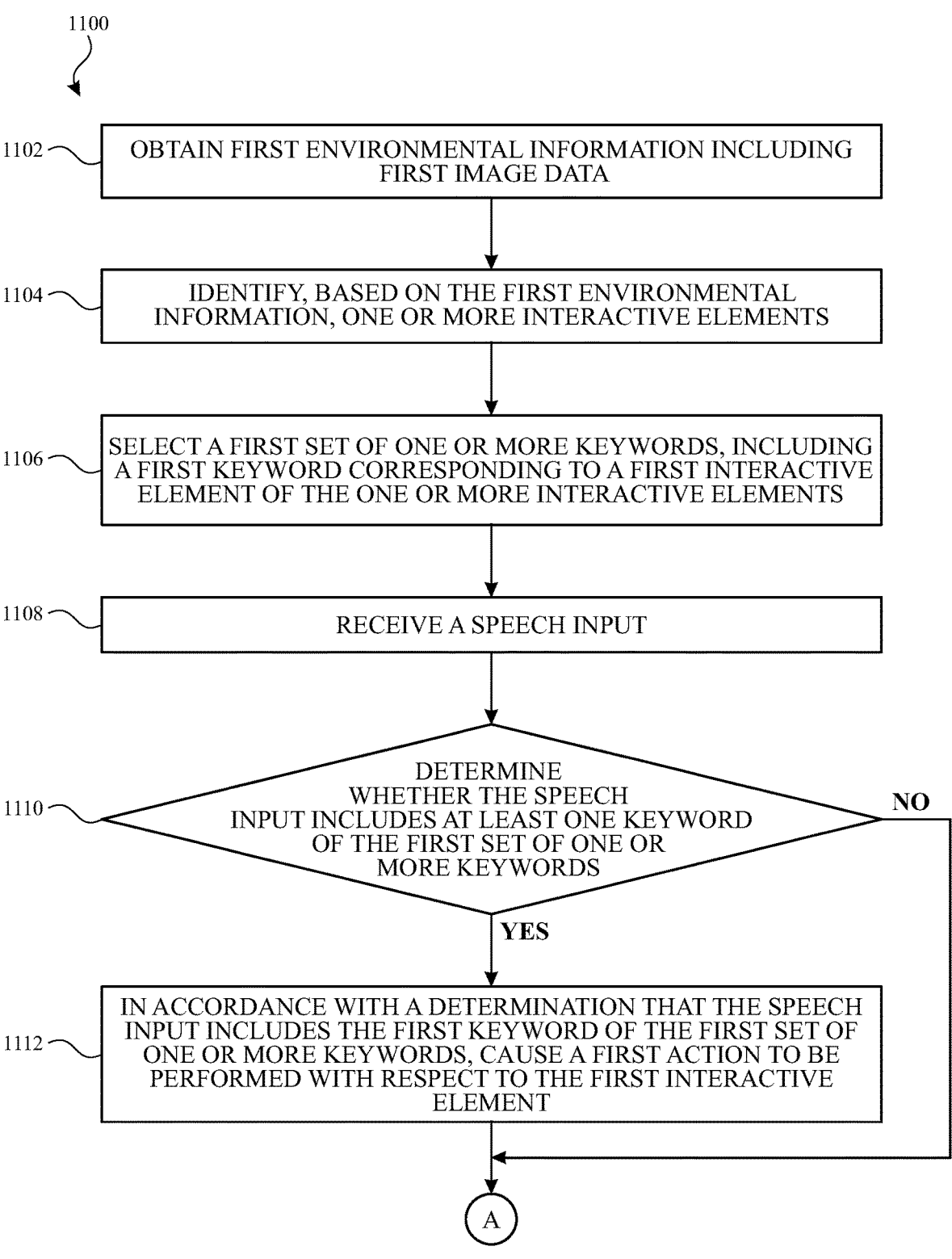

1100

1102 — OBTAIN FIRST ENVIRONMENTAL INFORMATION INCLUDING FIRST IMAGE DATA

1104 — IDENTIFY, BASED ON THE FIRST ENVIRONMENTAL INFORMATION, ONE OR MORE INTERACTIVE ELEMENTS

1106 — SELECT A FIRST SET OF ONE OR MORE KEYWORDS, INCLUDING A FIRST KEYWORD CORRESPONDING TO A FIRST INTERACTIVE ELEMENT OF THE ONE OR MORE INTERACTIVE ELEMENTS

1108 — RECEIVE A SPEECH INPUT

1110 — DETERMINE WHETHER THE SPEECH INPUT INCLUDES AT LEAST ONE KEYWORD OF THE FIRST SET OF ONE OR MORE KEYWORDS

NO

YES

1112 — IN ACCORDANCE WITH A DETERMINATION THAT THE SPEECH INPUT INCLUDES THE FIRST KEYWORD OF THE FIRST SET OF ONE OR MORE KEYWORDS, CAUSE A FIRST ACTION TO BE PERFORMED WITH RESPECT TO THE FIRST INTERACTIVE ELEMENT

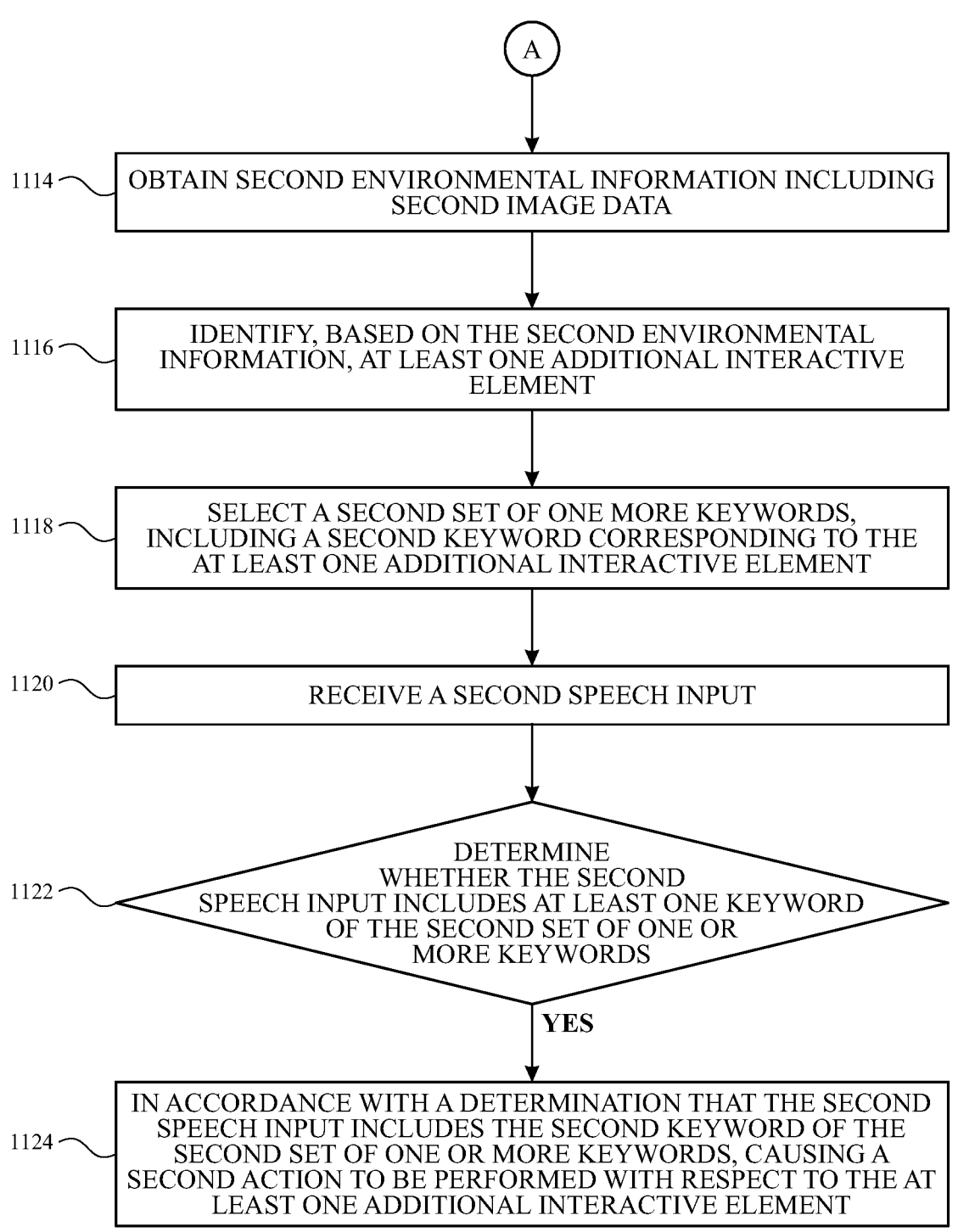

1114 — OBTAIN SECOND ENVIRONMENTAL INFORMATION INCLUDING SECOND IMAGE DATA

1116 — IDENTIFY, BASED ON THE SECOND ENVIRONMENTAL INFORMATION, AT LEAST ONE ADDITIONAL INTERACTIVE ELEMENT

1118 — SELECT A SECOND SET OF ONE MORE KEYWORDS, INCLUDING A SECOND KEYWORD CORRESPONDING TO THE AT LEAST ONE ADDITIONAL INTERACTIVE ELEMENT

1120 — RECEIVE A SECOND SPEECH INPUT

1122 — DETERMINE WHETHER THE SECOND SPEECH INPUT INCLUDES AT LEAST ONE KEYWORD OF THE SECOND SET OF ONE OR MORE KEYWORDS

YES

1124 — IN ACCORDANCE WITH A DETERMINATION THAT THE SECOND SPEECH INPUT INCLUDES THE SECOND KEYWORD OF THE SECOND SET OF ONE OR MORE KEYWORDS, CAUSING A SECOND ACTION TO BE PERFORMED WITH RESPECT TO THE AT LEAST ONE ADDITIONAL INTERACTIVE ELEMENT

*FIG. 11B*

VOICE CONTROL WITH CONTEXTUAL KEYWORDS

CROSS-REFERENCE TO RELATED APPLICATIONS

This application claims priority to U.S. Provisional Patent Application No. 63/434,425, entitled "VOICE CONTROL WITH CONTEXTUAL KEYWORDS," filed Dec. 21, 2022, and U.S. Provisional Patent Application No. 63,407,531, entitled "VOICE CONTROL WITH CONTEXTUAL KEYWORDS," filed Sep. 16, 2022, the contents of which are hereby incorporated by reference in their entirety.

FIELD

This relates generally to intelligent automated assistants and, more specifically, to providing voice control with selected keywords.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

An electronic device may be controlled using voice inputs. Some voice control systems may be able to handle a relatively unlimited vocabulary, for instance, using natural-language processing techniques to interpret natural-language voice inputs. However, full-vocabulary natural-language processing systems can be processor intensive, power intensive, or slow. On the other hand, voice control systems using a relatively limited, "canned" vocabulary may sacrifice functionality, as fewer voice commands are available. Additionally, voice control systems can result in false positive responses if a microphone detects ambient noise, speech from an unintended user, or speech not intended for the electronic device (e.g., a user talking to another person).

SUMMARY

Example methods are disclosed herein. An example method includes, at an electronic device having one or more processors and memory, obtaining first contextual information; selecting, based on the contextual information, a first set of one or more keywords; receiving a speech input; determining whether the speech input includes at least one keyword of the first set of one or more keywords; and in accordance with a determination that the speech input includes at least one keyword of the first set of one or more keywords, performing a first action.

Example non-transitory computer-readable media are disclosed herein. An example non-transitory computer-readable storage medium stores one or more programs. The one or more programs comprise instructions, which when executed by one or more processors of an electronic device, cause the electronic device to obtain first contextual information; select, based on the contextual information, a first set of one or more keywords; receive a speech input; determine whether the speech input includes at least one keyword of the first set of one or more keywords; and in accordance with a determination that the speech input includes at least one keyword of the first set of one or more keywords, perform a first action.

Example electronic devices are disclosed herein. An example electronic device comprises one or more processors; a memory; and one or more programs, where the one or more programs are stored in the memory and configured to be executed by the one or more processors, the one or more programs including instructions for obtaining first contextual information; selecting, based on the contextual information, a first set of one or more keywords; receiving a speech input; determining whether the speech input includes at least one keyword of the first set of one or more keywords; and in accordance with a determination that the speech input includes at least one keyword of the first set of one or more keywords, performing a first action.

An example electronic device comprises means for obtaining first contextual information; selecting, based on the contextual information, a first set of one or more keywords; receiving a speech input; determining whether the speech input includes at least one keyword of the first set of one or more keywords; and in accordance with a determination that the speech input includes at least one keyword of the first set of one or more keywords, performing a first action.

Example methods are disclosed herein. An example method includes, at an electronic device having one or more processors and memory, obtaining first environmental information, wherein the first environmental information includes first image data; identifying, based on the first environmental information, one or more interactive elements; selecting a first set of one or more keywords, wherein a first keyword of the first set of one or more keywords corresponds to a first interactive element of the one or more interactive elements; receiving a speech input; determining whether the speech input includes at least one keyword of the first set of one or more keywords; and in accordance with a determination that the speech input includes the first keyword of the first set of one or more keywords, causing a first action to be performed with respect to the first interactive element.

Example non-transitory computer-readable media are disclosed herein. An example non-transitory computer-readable storage medium stores one or more programs. The one or more programs comprise instructions, which when executed by one or more processors of an electronic device, cause the electronic device to obtain first environmental information, wherein the first environmental information includes first image data; identify, based on the first environmental information, one or more interactive elements; select a first set of one or more keywords, wherein a first keyword of the first set of one or more keywords corresponds to a first interactive element of the one or more interactive elements; receive a speech input; determine whether the speech input includes at least one keyword of the first set of one or more keywords; and in accordance with a determination that the speech input includes the first keyword of the first set of one or more keywords, cause a first action to be performed with respect to the first interactive element.

Example electronic devices are disclosed herein. An example electronic device comprises one or more processors; a memory; and one or more programs, where the one or more programs are stored in the memory and configured to be executed by the one or more processors, the one or more programs including instructions for obtaining first environmental information, wherein the first environmental information includes first image data; identifying, based on the first environmental information, one or more interactive elements; selecting a first set of one or more keywords, wherein a first keyword of the first set of one or more keywords corresponds to a first interactive element of the one or more interactive elements; receiving a speech input; determining whether the speech input includes at least one keyword of the first set of one or more keywords; and in accordance with a determination that the speech input includes the first keyword of the first set of one or more keywords, causing a first action to be performed with respect to the first interactive element.

An example electronic device comprises means for obtaining first environmental information, wherein the first environmental information includes first image data; identifying, based on the first environmental information, one or more interactive elements; selecting a first set of one or more keywords, wherein a first keyword of the first set of one or more keywords corresponds to a first interactive element of the one or more interactive elements; receiving a speech input; determining whether the speech input includes at least one keyword of the first set of one or more keywords; and in accordance with a determination that the speech input includes the first keyword of the first set of one or more keywords, causing a first action to be performed with respect to the first interactive element.

Example methods are disclosed herein. An example method includes, at an electronic device having one or more processors, a display, and memory, displaying a first user interface including at least a first element; selecting a first set of one or more keywords, wherein a first keyword of the one or more keywords corresponds to the first element of the first user interface; receiving a speech input; determining whether the speech input includes at least one keyword of the first set of one or more keywords; and in accordance with a determination that the speech input includes the first keyword of the first set of one or more keywords, causing a first action to be performed with respect to the first element of the first user interface.

Example non-transitory computer-readable media are disclosed herein. An example non-transitory computer-readable storage medium stores one or more programs. The one or more programs comprise instructions, which when executed by one or more processors of an electronic device, cause the electronic device to display a first user interface including at least a first element; select a first set of one or more keywords, wherein a first keyword of the one or more keywords corresponds to the first element of the first user interface; receive a speech input; determine whether the speech input includes at least one keyword of the first set of one or more keywords; and in accordance with a determination that the speech input includes the first keyword of the first set of one or more keywords, cause a first action to be performed with respect to the first element of the first user interface.

Example electronic devices are disclosed herein. An example electronic device comprises one or more processors; a memory; and one or more programs, where the one or more programs are stored in the memory and configured to be executed by the one or more processors, the one or more programs including instructions for displaying a first user interface including at least a first element; selecting a first set of one or more keywords, wherein a first keyword of the one or more keywords corresponds to the first element of the first user interface; receiving a speech input; determining whether the speech input includes at least one keyword of the first set of one or more keywords; and in accordance with a determination that the speech input includes the first keyword of the first set of one or more keywords, causing a first action to be performed with respect to the first element of the first user interface.

An example electronic device comprises means for displaying a first user interface including at least a first element; selecting a first set of one or more keywords, wherein a first keyword of the one or more keywords corresponds to the first element of the first user interface; receiving a speech input; determining whether the speech input includes at least one keyword of the first set of one or more keywords; and in accordance with a determination that the speech input includes the first keyword of the first set of one or more keywords, causing a first action to be performed with respect to the first element of the first user interface.

Providing voice control of a system using keywords selected based on contextual information, as described herein, provides an intuitive and efficient approach for controlling an electronic device. For example, the contextual information can be used to determine which keywords are relevant to and/or likely to be invoked in the current context, and thereby restrict the keywords that the system will listen for and respond to (e.g., the active keywords) to a contextually-limited keyword set. As the contextually-limited keyword set may be much smaller (e.g., by orders of magnitude) than a full-scale natural language vocabulary, listening for the contextually-limited keyword set requires relatively little processing power and battery life compared to a full-scale natural-language processing (NLP) system. Additionally, by restricting the keywords the systems described herein will respond to at a given time to contextually-relevant keywords, false positive responses (e.g., responses to speech not intended for voice control, such as speech intended for another person, ambient noise, and the like) are reduced, as the system will not attempt to respond to all detected speech. At the same time, because the contextually-limited keyword set does include keywords that are relevant to and/or likely to be invoked the current context, a high level of voice control functionality is maintained from the user perspective.

BRIEF DESCRIPTION OF THE DRAWINGS

FIG. 4 is a block diagram of an exemplary multifunction device with a display and a touch-sensitive surface, according to various examples.

FIG. 5B illustrates an exemplary user interface for a multifunction device with a touch-sensitive surface that is separate from the display, according to various examples.

FIGS. 11A-11B illustrate a flow diagram for a method of environmental voice control with selected keywords, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Keywords may be used for voice control of an electronic device, such that if a speech input including an active keyword is detected, the electronic device causes an action to be performed in response to the speech input. The set of keywords that are active at a given time (e.g., the keywords that a system will listen for and respond to) are selected based on the current context.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
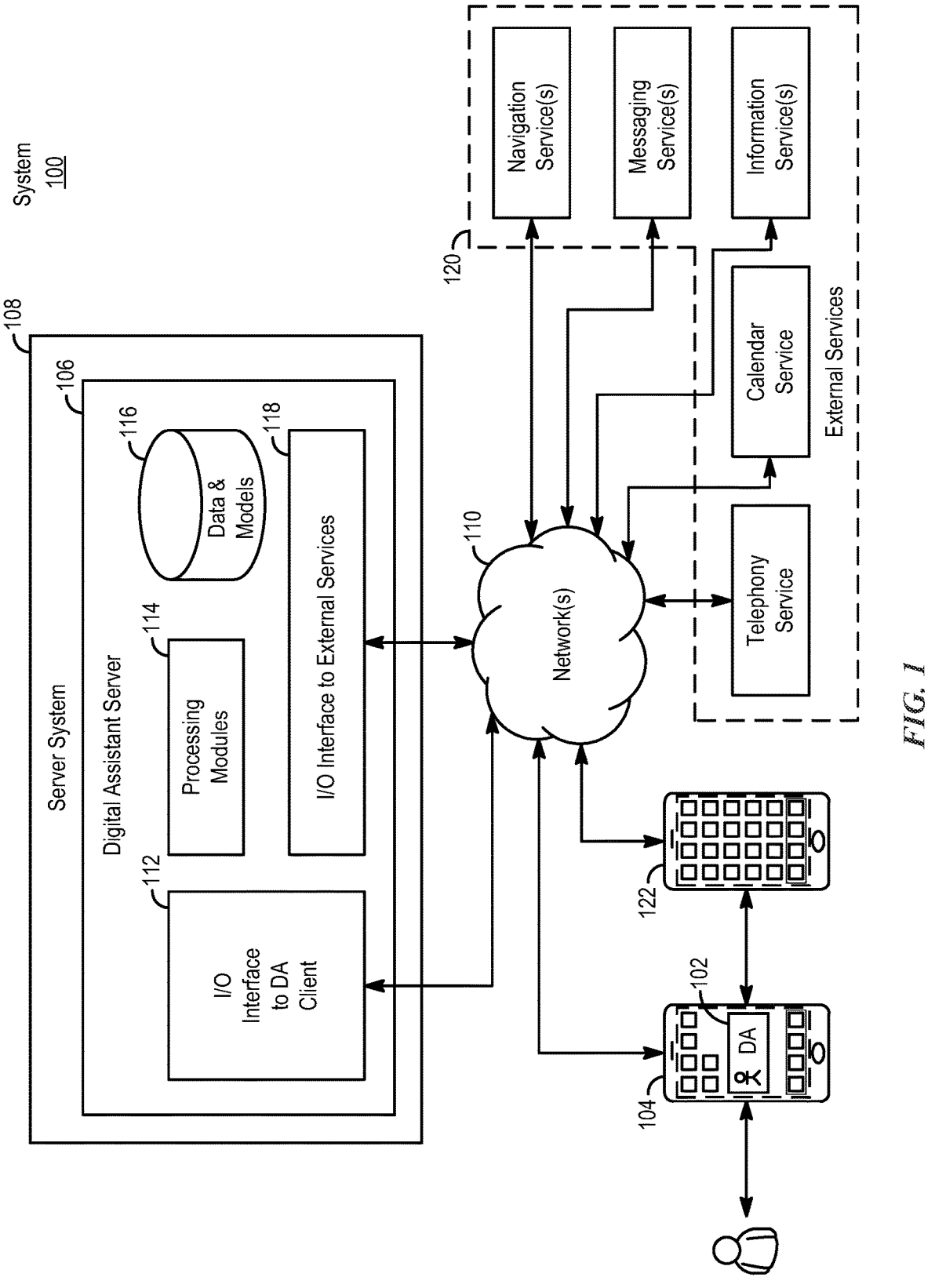
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B). A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
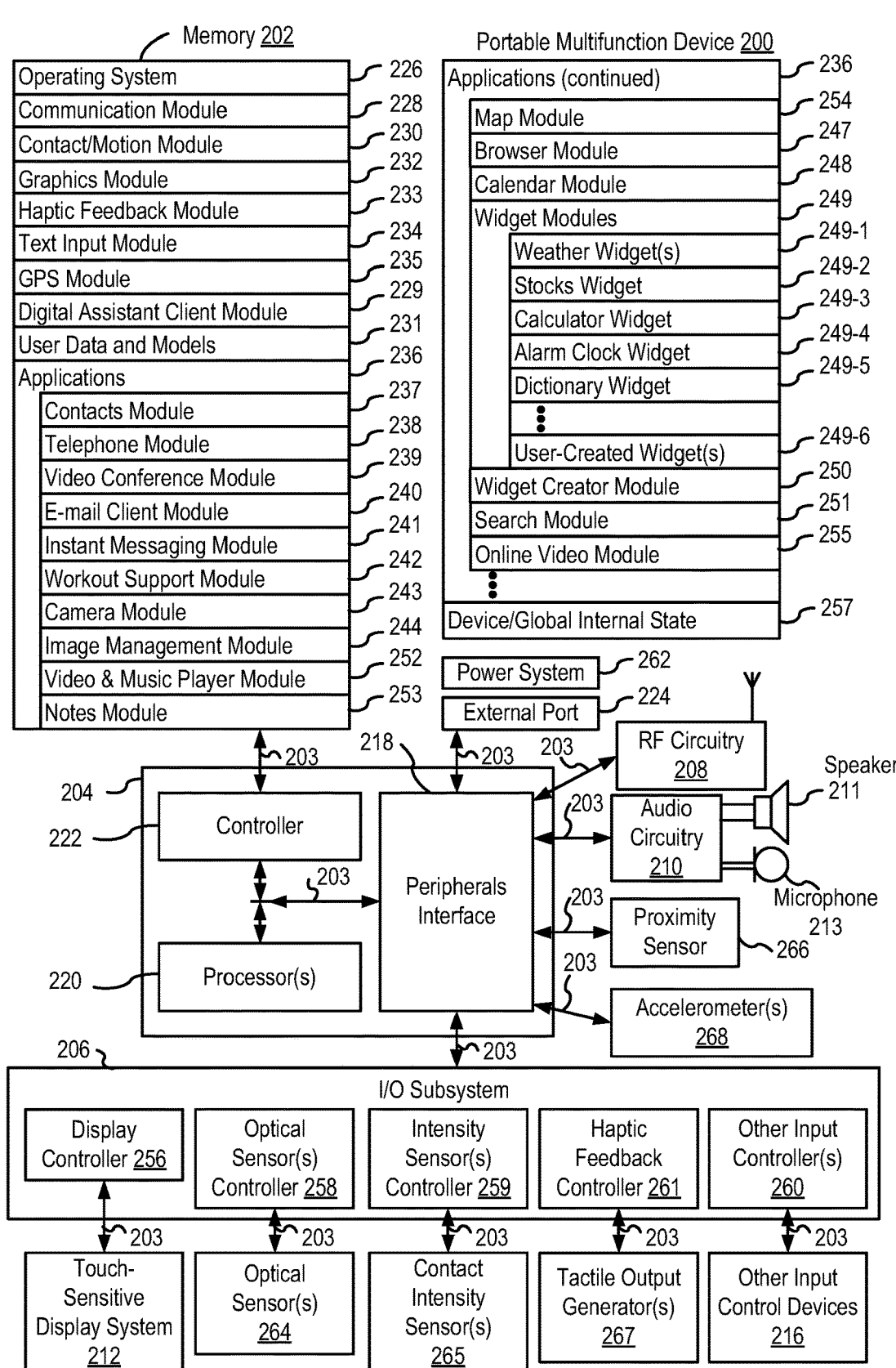
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.1 lac), voice over Internet Protocol (VoTP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email client module 240, IM 241, browser 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

Contacts module 237 (sometimes called an address book or contact list);

Telephone module 238;

Video conference module 239;

E-mail client module 240;

Instant messaging (IM) module 241;

Workout support module 242;

Camera module 243 for still and/or video images;

Image management module 244;

Video player module;

Music player module;

Browser module 247;

Calendar module 248;

Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;

Widget creator module 250 for making user-created widgets 249-6;

Search module 251;

Video and music player module 252, which merges video player module and music player module;

Notes module 253;

Map module 254; and/or

Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or AIPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
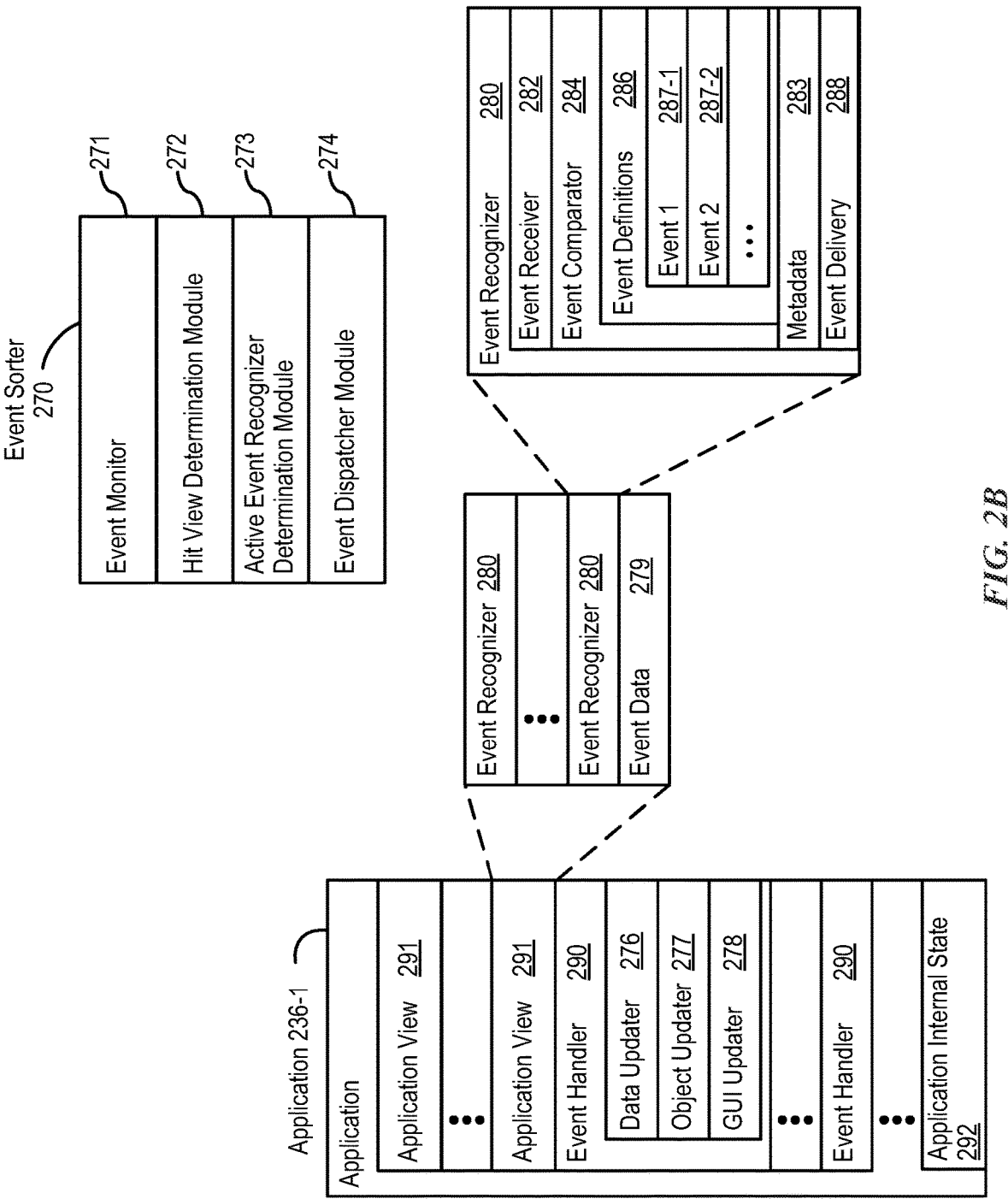
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of:

resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
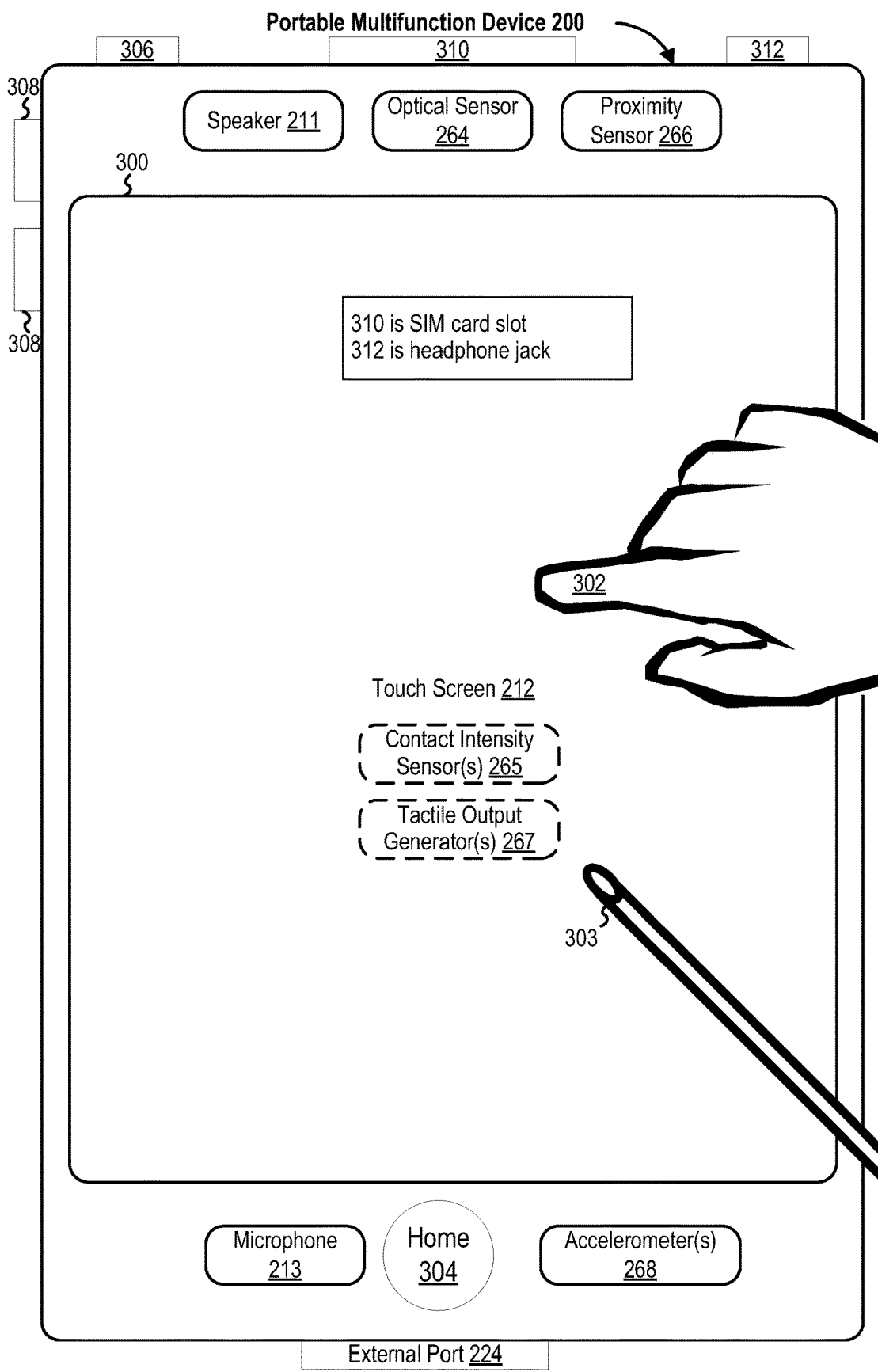
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200.

Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
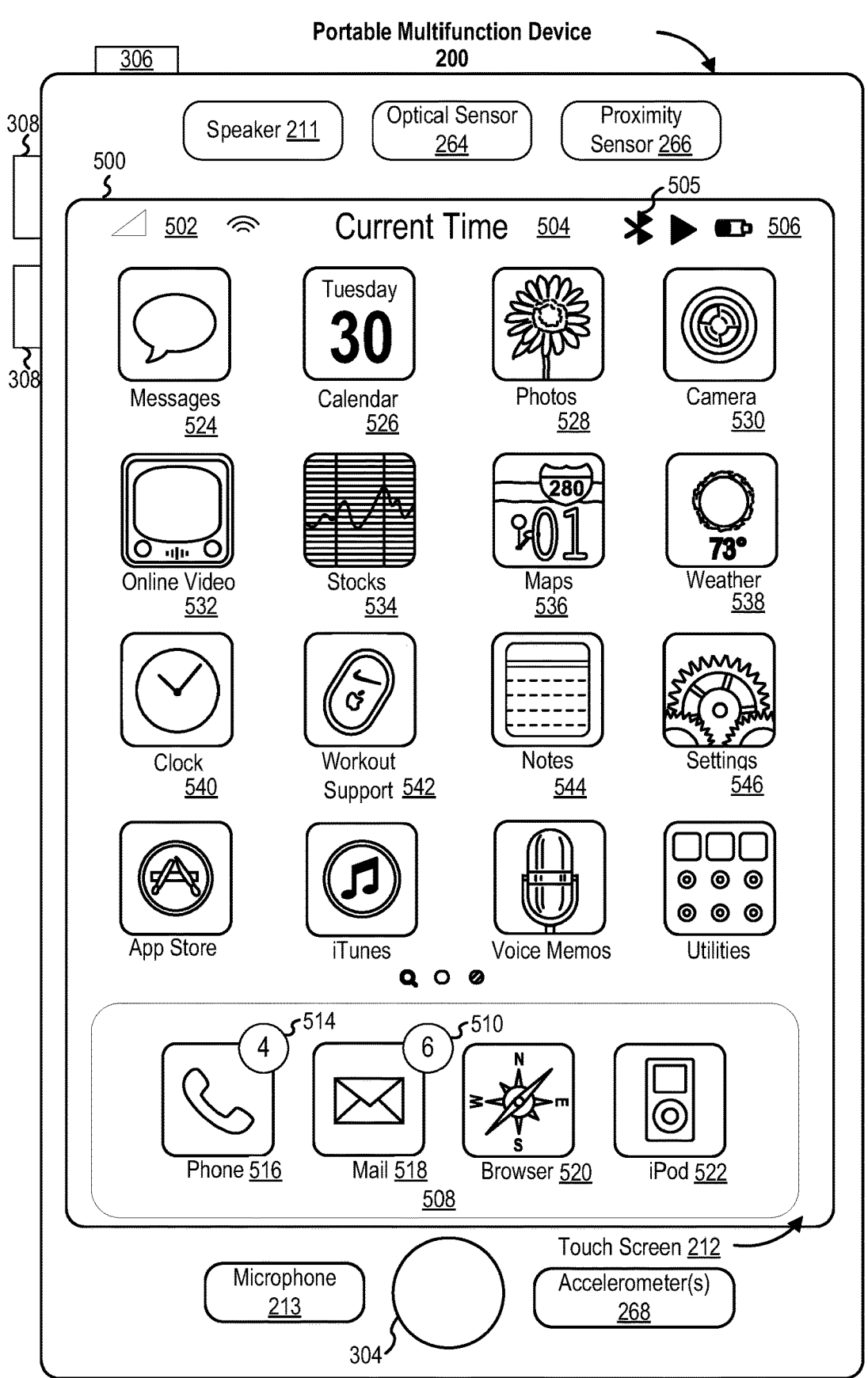
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

Icon 516 for telephone module 238, labeled "Phone," which optionally includes an indicator 514 of the number of missed calls or voicemail messages;

Icon 518 for e-mail client module 240, labeled "Mail," which optionally includes an indicator 510 of the number of unread e-mails;

Icon 520 for browser module 247, labeled "Browser;" and

Icon 522 for video and music player module 252, also referred to as iPod (trademark of Apple Inc.) module 252, labeled "iPod;" and Icons for other applications, such as:

Icon 524 for IM module 241, labeled "Messages;"

Icon 526 for calendar module 248, labeled "Calendar;"

Icon 528 for image management module 244, labeled "Photos;"

Icon 530 for camera module 243, labeled "Camera;"

Icon 532 for online video module 255, labeled "Online Video;"

Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 459) for detecting intensity of contacts on touch-sensitive surface 551 and/or one or more tactile output generators 457 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
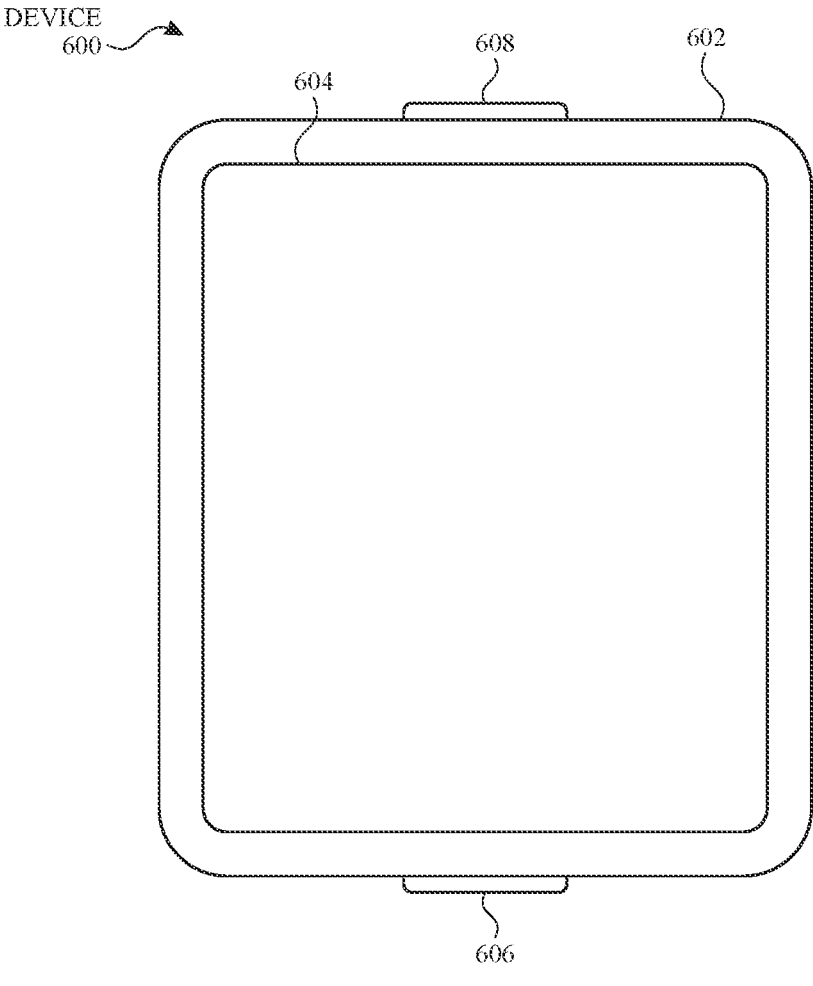
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
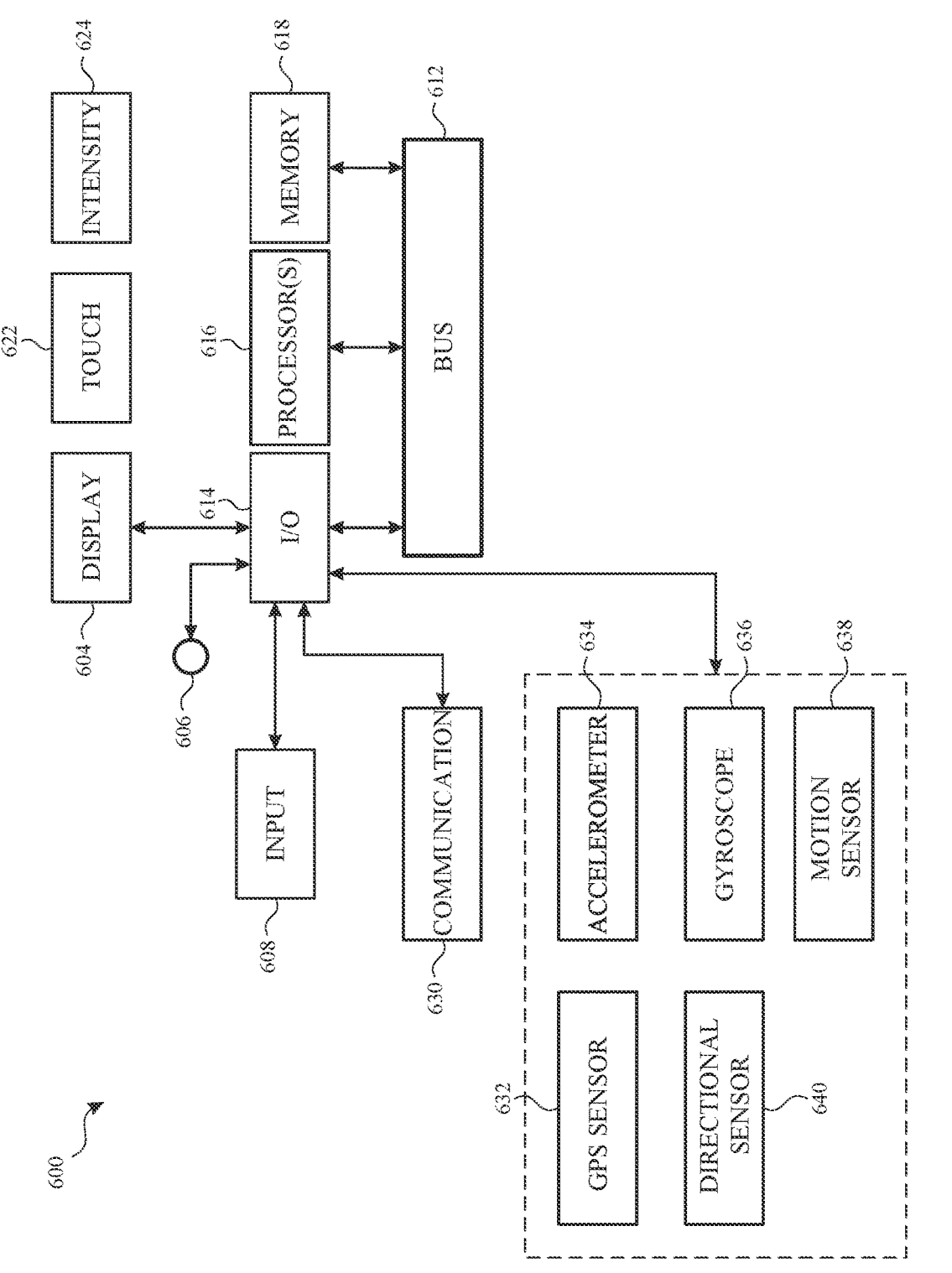
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
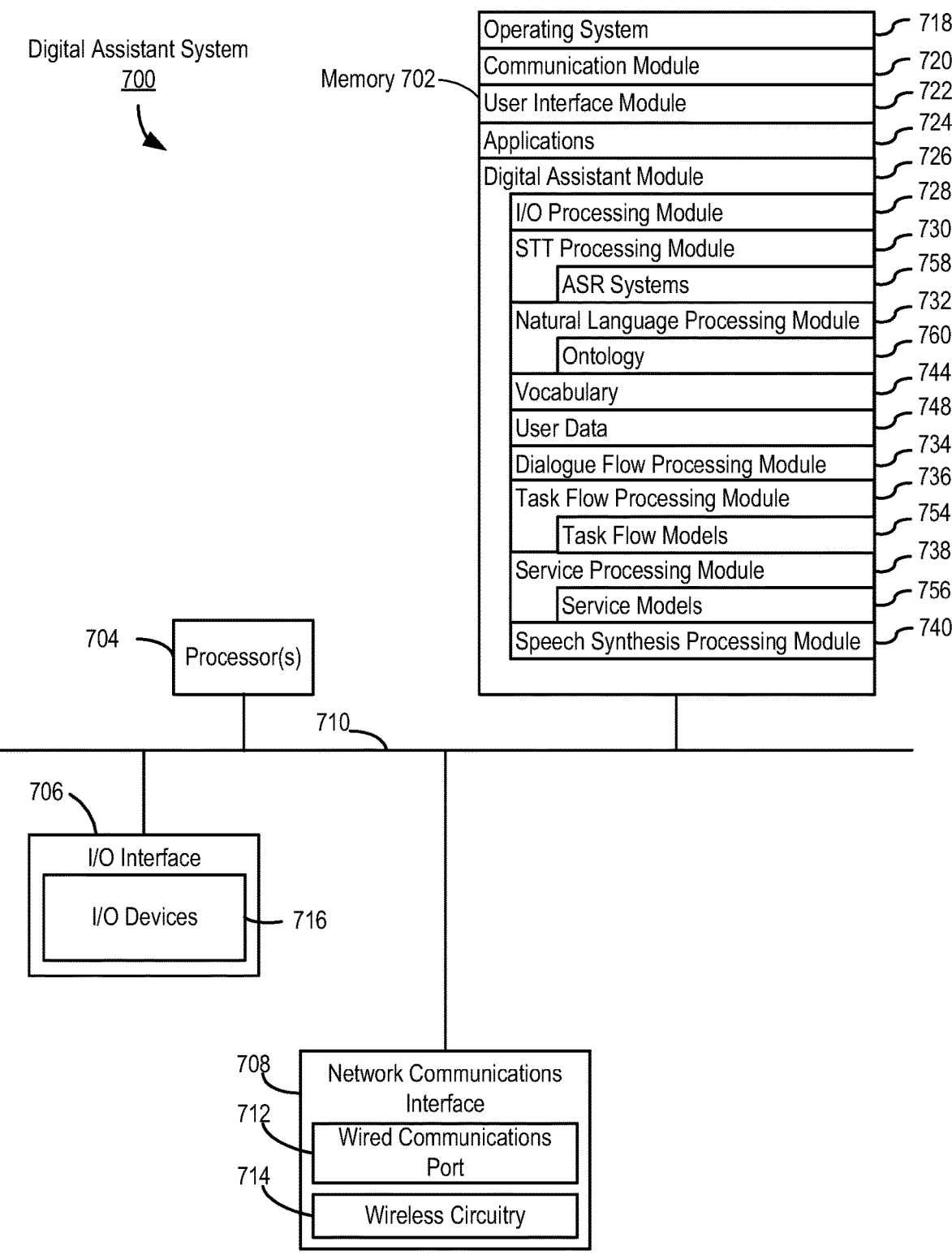
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
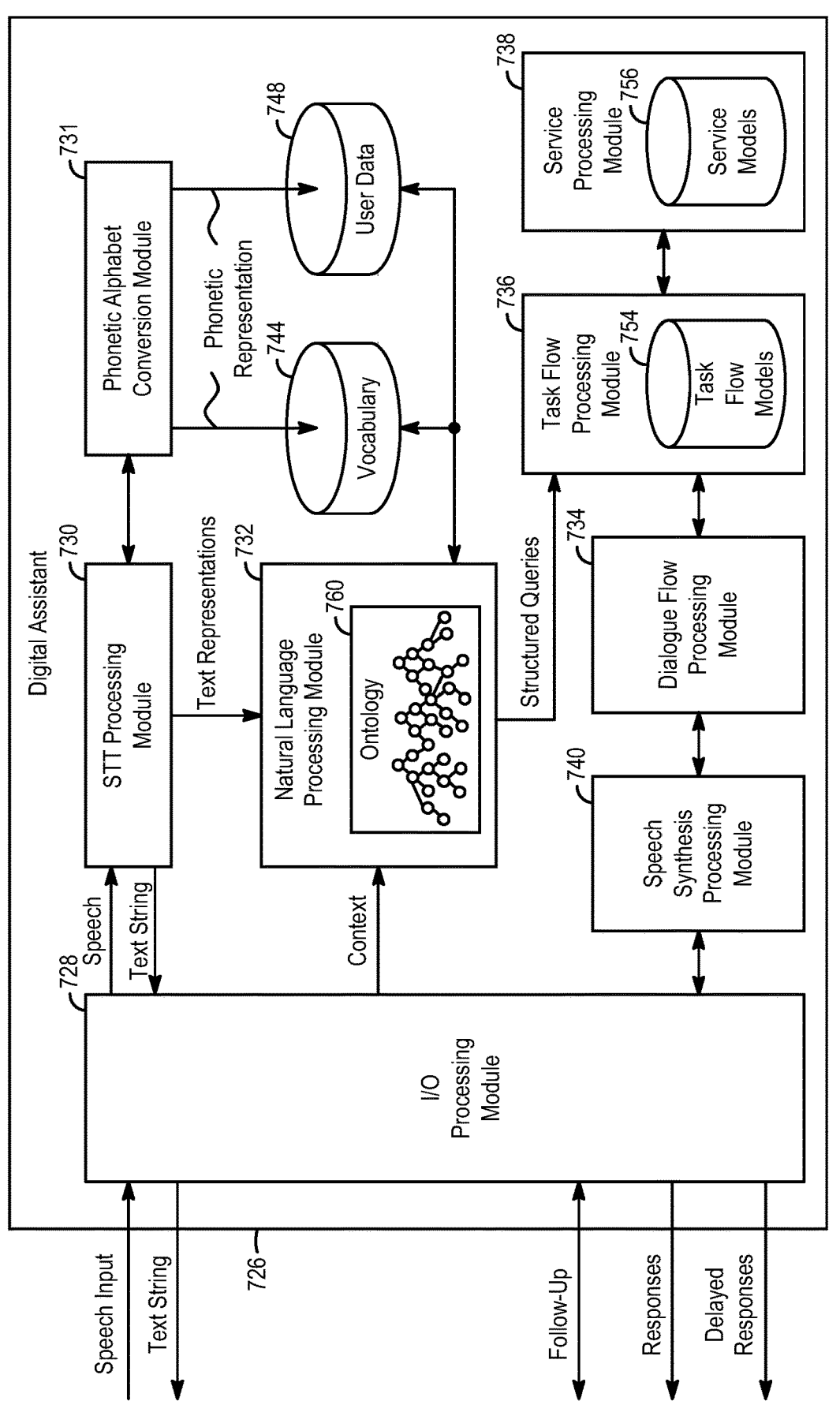
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪɾoʊ/ and /tə'mɑtoʊ/ . Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪɾoʊ/ is ranked higher than /tə'mɑtoʊ/ , because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪɾoʊ/ is associated with the United States, whereas the candidate pronunciation /tə'mɑtoʊ/ is associated with Great Britain.

Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪɾoʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪɾoʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
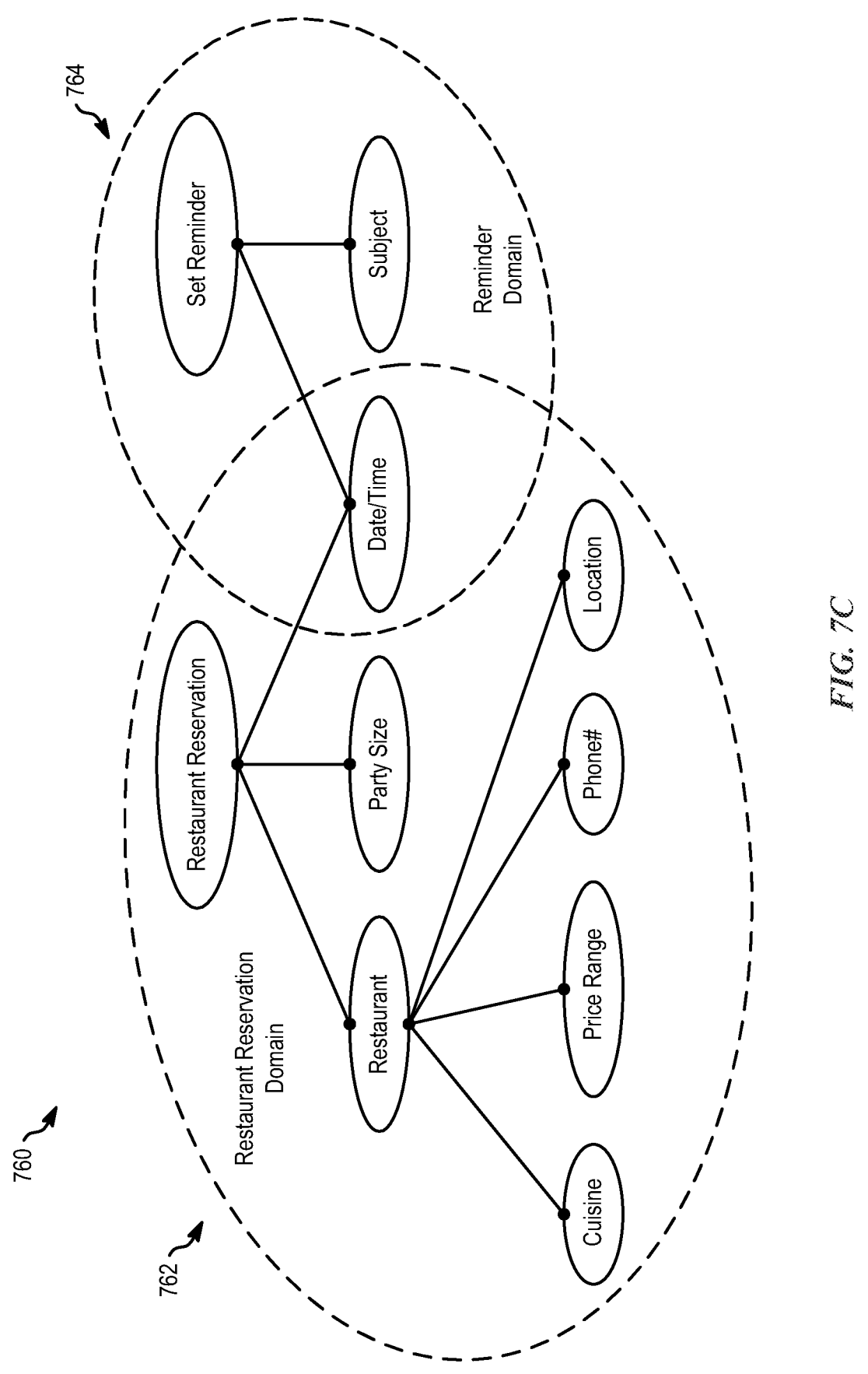
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi" } and {Time="7 pm" }. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Process for Providing Voice Control with Selected Keywords

Figures 8A, 8B:
FIGS. 8A-8B illustrate a system for voice control with selected keywords, according to various examples.

FIGS. 8A-8B illustrate system 800 for providing voice control with selected keywords, according to various examples. System 800 is implemented, for example, using one or more electronic devices implementing a digital assistant (e.g., digital assistant system 700). In some examples, system 800 is implemented using a client-server system (e.g., system 100), and the functions of system 800 are divided up in any manner between the server (e.g., DA server 106) and a client device. In other examples, the functions of system 800 are divided up between the server and multiple client devices (e.g., a mobile phone and a wearable computing device or another peripheral device). Thus, while some functions of system 800 are described herein as being performed by particular devices of a client-server system, it will be appreciated that system 800 is not so limited. In other examples, system 800 is implemented using only a client device (e.g., user device 104) or only multiple client devices. In system 800, some functions are, optionally, combined, the order of some functions is, optionally, changed, and some functions are, optionally, omitted. In some examples, additional functions may be performed in combination with the system 800.

In order to select keywords for voice control, device 802 obtains contextual information. In some embodiments, the contextual information includes current device context, such as the current location, time/date, wired or wireless network connections, detected or connected devices (e.g., via WiFi, 5G, Bluetooth, ultra wideband (UWB), wired connections, and the like), application status, current or recent device events, and so forth. For example, as illustrated in FIG. 8A, the contextual information may include current device context indicating the current device event of an alarm going off, such as application information (e.g., indicating that a clock application is providing the alarm) and/or user interface information (e.g., indicating that "snooze" and "stop" affordances are presented as part of the alarm). As another example, the contextual information may include the current time (e.g., 7:30 AM), the current location (e.g., at home), information indicating that the user has recently received an email notification, information indicating connected or nearby devices (e.g., smart speaker, a smart light device, a smart tv, etc.), and so forth. As another example, the contextual information may include recent device events, such as information indicating that the user uttered the keyword "snooze" in response to an alarm ten minutes ago.

In some embodiments, some or all of the obtained contextual information is received from one or more sensors (e.g., cameras, microphones, accelerometers, GPS, infrared sensors, light sensors, touch sensors, biometric sensors, etc.) of device 802 and/or devices in communication with device 802 (e.g., sensors of headphones, a smart watch, smart home devices, etc. connected to device 802 via WiFi, Bluetooth, UWB, wired connections, etc.). For example, as illustrated in FIG. 8A, the contextual information may include data from an accelerometer indicating that device 802 is currently in a face-down position, data from a GPS indicating that device 802 is at a user's home address, and so forth. In some embodiments, the contextual information may include user data, such as usage history, user settings, or user profile information. For example, usage history of device 802 may indicate that the user of device 802 typically turns on the smart light switch between 7:00 AM and 8:00 AM on weekdays.

Based on the obtained contextual information, a first set of one or more keywords is selected. For example, based on the current device context indicating that an alarm is going off, system 800 may select the keywords "stop" and "snooze" to activate. As another example, based on contextual information such as the current time (7:30 AM) and the usage history indicating that the user typically turns on a connected smart light device between 7:00 AM and 8:00 AM, system 800 may select the keyword "turn on" for turning on the smart light device. On the other hand, based on contextual information indicating that the device is in a face-down position, and thus, that the user is not looking at the email notification, system 800 may refrain from selecting they keyword "open" for opening the email notification. Accordingly, the obtained contextual information can be used to select (e.g., activate) a set of keywords that are relevant to and/or likely to be invoked by the user in the current context (e.g., "stop," "snooze," and "turn on") for voice control of system functionality (e.g., keyword-enabled actions, such as stopping an alarm, snoozing an alarm, or turning on a connected smart light device).

In some embodiments, some or all keywords included in the first set of keywords are selected from a predetermined keyword vocabulary, which may include default system keywords, application-designated keywords, and so forth. For example, the keywords "snooze" and "stop" for alarms may be included in the overall keyword vocabulary as part of the default clock functionality of system 1000, while the keywords "turn on" and "turn off" for a smart light device may be added to the overall keyword vocabulary by a smart home application (e.g., upon installation or update of the smart home application, or when the user registers a smart light device with the smart home application).

In some embodiments, some or all keywords included in the first set of keywords may be selected from a user-specific keyword vocabulary (e.g., a keyword vocabulary including keywords previously used by, preferred by, or predicted to be used by a particular user of system 800). In some embodiments, if a user has previously accessed a keyword-enabled action by using a digital assistant of system 800 (e.g., digital assistant system 700) capable of full natural language processing (NLP), the digital assistant interaction may be mined for candidate keywords to include in the user-specific keyword vocabulary. For example, if the user has previously uttered "Hey Assistant, light it up" in order to turn on the connected smart light device, the phrase "light it up" may be added to the user-specific keyword vocabulary and later selected for the first set of keywords (e.g., instead of or in addition to the non-user specific keyword "turn on" for the same action).

System 800 receives speech input 804, "Snooze for 15 minutes." For example, speech input 804 may be an utterance from a user received via a microphone of device 802 or of a different connected device, such as a smart watch, speaker, headphones, or the like. Upon receiving speech input 804, system 800 determines whether speech input 804 includes at least one keyword of the selected first set of keywords (e.g. whether the user has uttered an active keyword). In some embodiments, determining whether speech input 804 includes at least one keyword of the selected first set of keywords (e.g. the active keywords) is performed using a first language model. For example, the first language model may be a limited-vocabulary automatic speech recognition (ASR) system, which is capable of detecting words and phrases from a limited vocabulary (e.g., a keyword vocabulary), but does not perform full NLP (e.g., to detect and understand a much larger natural-language vocabulary and grammar).

In some embodiments, in order to determine whether speech input 804 includes an active keyword, system 800 extracts a set of acoustic features (e.g., speech parameters) from the speech input, e.g., using the ASR system of the first language model. In some such embodiments, as system 800 is only determining whether speech input 804 includes any keywords from the relatively limited first (e.g., active) set of keywords, system 800 may accurately determine whether speech input 804 includes an active keyword by extracting a relatively small number of acoustic features compared to a large-vocabulary speech recognition (LVCSR) system (e.g., an NLP system implemented by a digital assistant of system 800 for recognizing and understanding relatively unrestricted natural language inputs). For example, while a full NLP system may rely on additional acoustic features to determine whether the speech input is a user speech input or background noise (e.g., speech coming from a television), as system 800 has already determined that "stop," "snooze," "turn on," and "light it up" are likely to be uttered by a user in the current context, system 800 can be relatively confident that, if any active keywords are detected, they are in fact user speech directed at system 800 without needing further processing or analysis. Accordingly, accurately determining whether speech input 804 includes an active keyword may be performed with relatively low latency and power usage by the first language model compared to performing unrestricted speech recognition using an LVCSR system.

In some embodiments, based on the extracted set of acoustic features, system 800 determines a confidence score for each keyword of the first set of keywords (e.g., the active keywords) representing a likelihood that speech input 804 includes the respective keyword. For example, based on speech input 804, system 800 may calculate a confidence score of 0.8 for the active keyword "Snooze," a confidence score of 0.6 for the active keyword "Stop," a confidence score of 0.2 for the active keyword "Turn On," and a confidence score of 0.2 for the active keyword "Light It Up."

In these embodiments, system 800 may determine which, if any, of the confidence scores satisfy confidence criteria. For example, the confidence score of 0.8 for the active keyword "Snooze" may satisfy an overall confidence threshold of 0.7, indicating sufficient confidence that the user uttered "Snooze," and/or a requirement that the confidence score exceed the next highest confidence score by at least 0.1, indicating sufficient confidence that the user did not utter a "stop" instead. In some embodiments, the extracted set of acoustic features, the confidence scores, and/or other ASR data produced during this determination are stored, such that the pre-processing data can be re-used if further speech processing is performed (e.g., as described below with respect to engaging a full NLP system).

In response to determining that speech input 804 includes at least one keyword, e.g., "Snooze," that is included in the first set of keywords (e.g., upon determining that the user uttered an active keyword), system 800 performs a first action. In some embodiments, the first action is determined based on the recognized keyword. For example, system 800 may determine that the keyword "Snooze" corresponds to the action of snoozing the alarm that is currently going off. Accordingly, device 802 will snooze the alarm.

In some embodiments, performing the first action includes engaging a second language model to determine at least one word included in speech input 804 (e.g., other than the recognized keyword, "Snooze"). In these embodiments, using the second language model to determine the other word may be performed in response to determining that speech input 804 includes speech content that does not correspond to a recognized active keyword. For example, based only on the recognized keyword "Snooze" corresponding to the first portion of speech input 804, system 800 can determine that an action of snoozing the alarm should be performed. However, since speech input 804 also includes the second portion "for 15 minutes," system 800 may determine that additional speech processing should be performed on speech input 804 to determine whether additional parameters for the snooze action have been specified by the non-keyword speech. Accordingly, performing the first action may also include determining the words "for 15 minutes" using the second language model, such that the action of snoozing the alarm is performed for the requested duration.

In some embodiments, the second language model may be a language model implemented by a digital assistant of system 800 for performing NLP on relatively unrestricted natural language inputs. For example, the second language model may include a LVCSR system. In some embodiments, the second language model may re-use the set of extracted acoustic features, confidence scores, and/or other pre-processing data produced while determining whether speech input 804 included an active keyword in order to more efficiently determine the other word(s). For example, the second language model may re-use previously-extracted acoustic features corresponding to the second portion of speech input 804, "for 15 minutes."

Alternatively, in some embodiments, if system 800 had instead determined that speech input 804 does not include any keywords of the first set of keywords, system 800 would forego performance of an action in response to speech input 804. For example, system 800 only listens for and responds to active keywords for the current context, not speech inputs in general, even if the speech input includes a keyword that might be active in a different context, and may only invoke the digital assistant/LVCSR system to recognize and understand speech received in addition to an active keyword (e.g., speech supplementing the active keyword), not to recognize and understand speech when no keyword has been detected.

Referring now to FIG. 8B, in some embodiments, system 800 obtains updated contextual information. For example, as illustrated in FIG. 8B, the updated contextual information may include the current time 7:32 AM, information indicating that an alarm is in a snooze state for another 13 minutes, and information about the current playback of a playlist titled "Morning Playlist" through a connected smart speaker, along with any of the contextual information discussed above that remains present or accurate (e.g., the location, the connected devices, etc.).

In these embodiments, a second set of one or more keywords, different from the first set of keywords, is selected based on the updated contextual information, for instance, as described above with respect to the selection of the first set of keywords based on the original contextual information. For example, based on the contextual information about the current music playback, system 800 may select the keywords "stop," "next song," "previous song," "skip song," "volume up," and "volume down" to activate. As another example, based on contextual information indicating the current time (7:32 AM) and that the user typically turns on connected smart light switches between 7:00 AM and 8:00 AM, system 800 may again select the keyword "turn on" and/or "light it up." On the other hand, as the context of the alarm going off (e.g., as discussed with respect to FIG. 8A) is no longer present, system 800 may refrain from selecting the keywords "stop" (as it relates to the alarm) and "snooze" for the second set of keywords (e.g., deactivating those previously-active contextual keywords).

In some embodiments, selecting the second set of keywords is performed in response to determining that the updated contextual information differs, at least in part, from the previously-obtained contextual information. For example, the second set of keywords may be selected in response to detecting that the contextual information now indicates that music is now being played back (and thus, that the keywords "stop," "next song," "previous song," "skip song," "volume up," and "volume down" may be appropriate to activate) and/or that the alarm is no longer going off (and thus, that the keywords "stop" (as it relates to the alarm) and "snooze" may be appropriate to deactivate).

As illustrated in FIG. 8B, in some embodiments, after selecting the second set of keywords, system 800 receives speech input 806, "Volume down." In these embodiments, system 800 determines whether speech input 806 includes at least one keyword of the selected second set of keywords (e.g., whether the user has uttered a currently-active keyword), for example, using the first, limited-vocabulary language model as discussed with respect to FIG. 8A. In response to determining that speech input 806 includes at least one keyword, "Volume down," which is included in the second set of keywords, system 800 performs a second action. For example, in response to detecting the active keyword "Volume down," and determining that no additional non-keyword speech was received in speech system 800 turns the playback volume down for the currently-playing music (e.g., the morning playlist).

Alternatively, in some embodiments, if system 800 instead determines that speech input 806 does not include any keywords of the second set of keywords, system 800 foregoes performance of an action in response to speech input 806. For example, even if the user had uttered a keyword that was selected for the first set of keywords (e.g., "snooze"), if that keyword was not selected as part of the second set of contextually-active keywords, and if no active keywords are detected instead, system 800 will not respond to the utterance (e.g., initiate an action and/or invoke a digital assistant/LVCSR system for processing of non-keyword speech).

The operations described above with reference to FIGS. 8A-8B are optionally implemented by components depicted in FIGS. 1-4, 6A-6B, and 7A-7C. For example, the operations of system 800 may be implemented by an electronic device (e.g., 104, 122, 200, 400, 600, 802), such as one implementing system 700. It would be clear to a person having ordinary skill in the art how other processes are implemented based on the components depicted in FIGS. 1-4, 6A-6B, and 7A-7C.

Figure 9A:
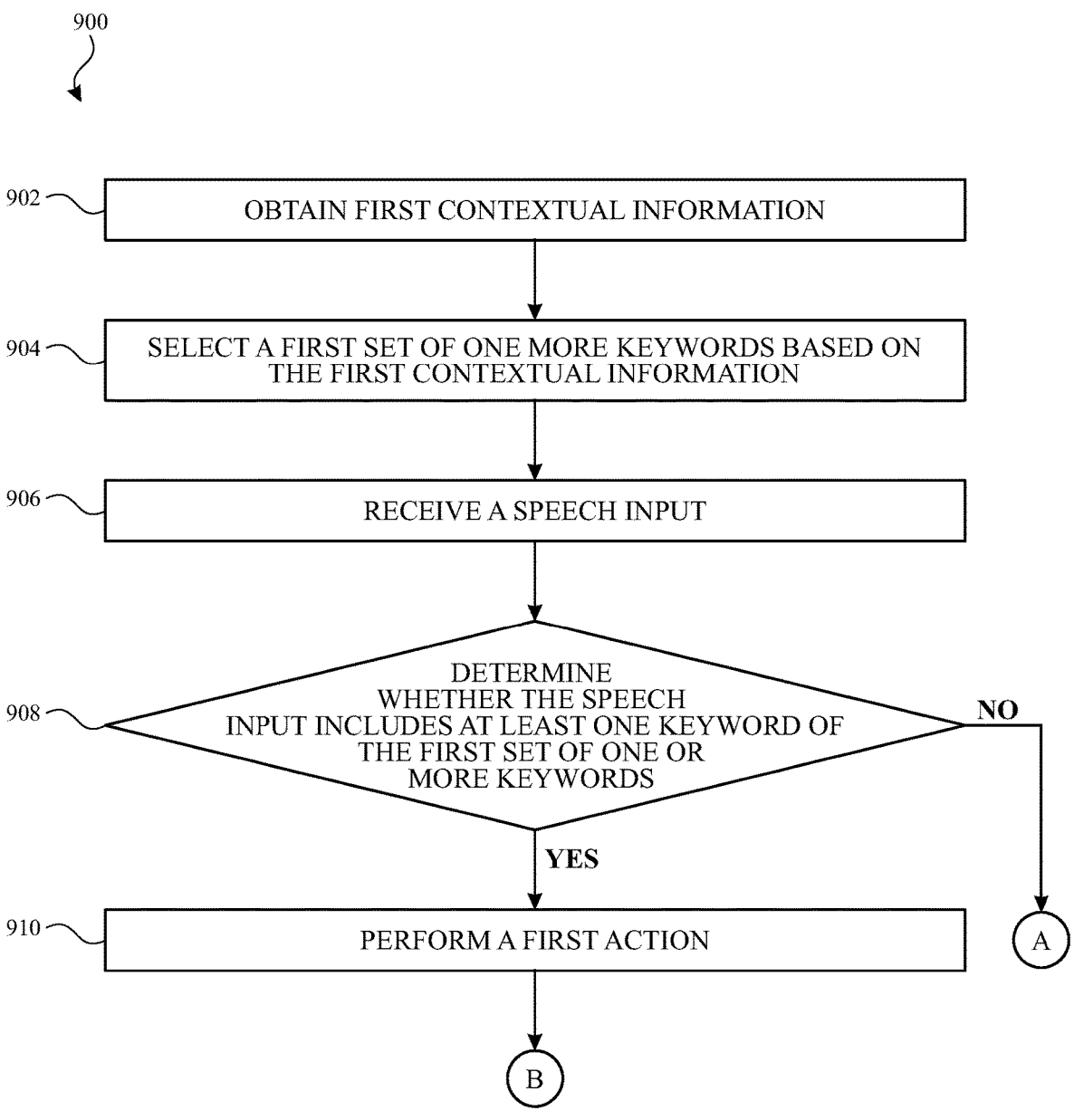
FIGS. 9A-9C illustrate a flow diagram for a method of voice control with selected keywords, according to various examples.
Figure 9B:
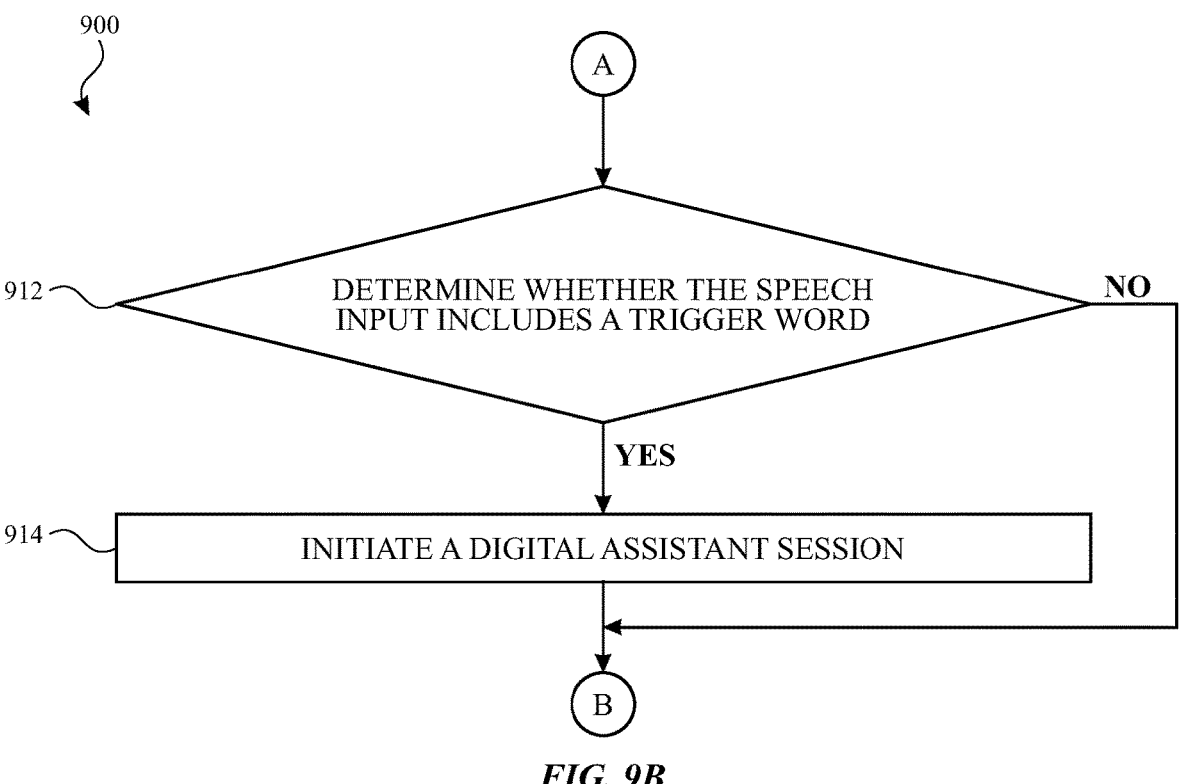
Figure 9C:
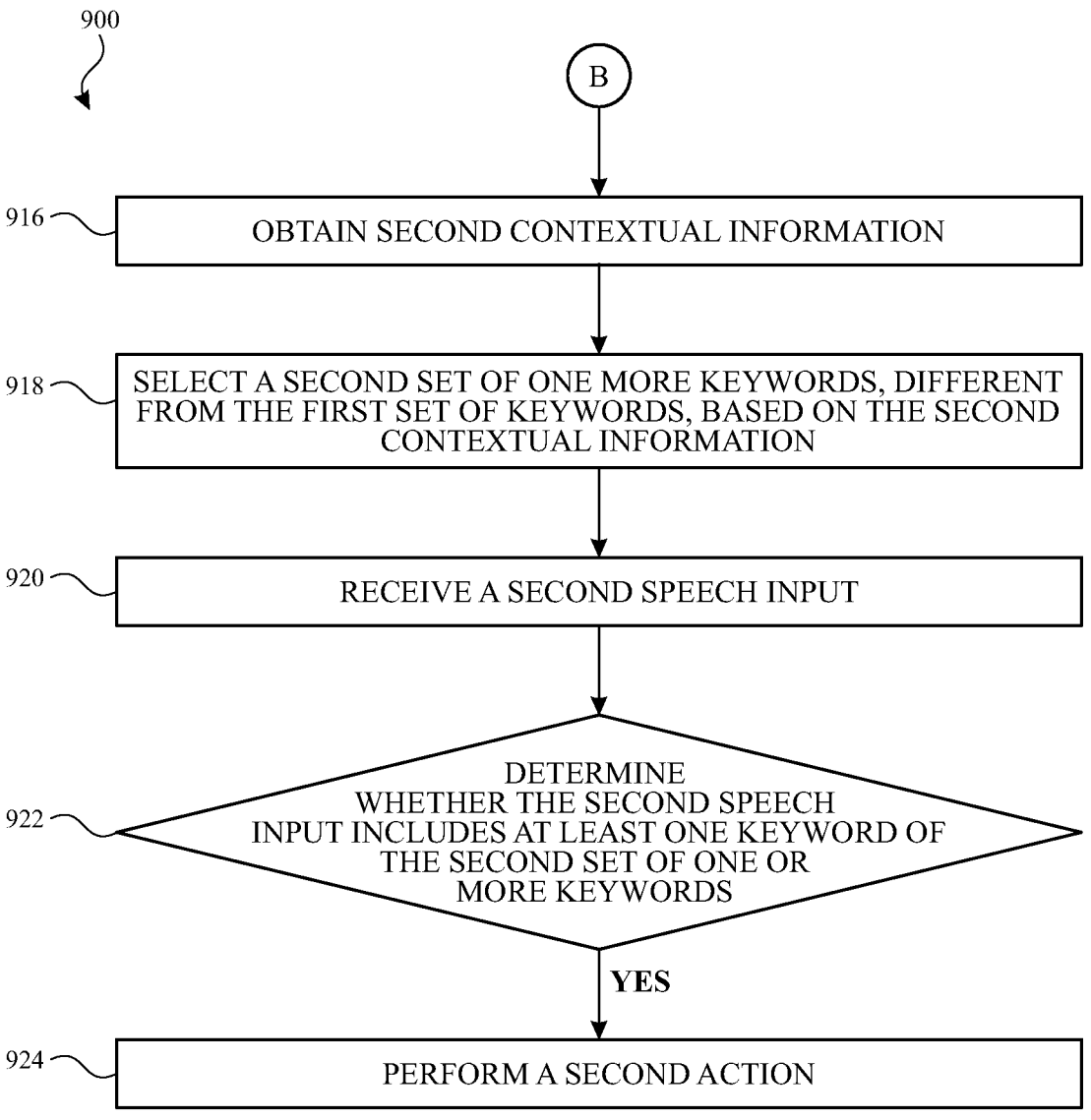

FIGS. 9A-9C are a flow diagram illustrating method 900 for providing voice control with selected keywords. Method 900 may be performed using one or more electronic devices (e.g., device 104, device 200, device 600, device 802) with one or more processors and memory. In some embodiments, method 900 is performed using a client-server system, with the operations of method 900 divided up in any manner between the client device(s) (e.g., 104, 200, 600, 802) and the server. Some operations in method 900 are, optionally, combined, the orders of some operations are, optionally, changed, and some operations are, optionally, omitted.

Referring to FIG. 9A, at block 902, first contextual information is obtained. For example, the first contextual information may be any information useful for determining whether a particular keyword is currently relevant and/or likely to be uttered by a user of a device implementing method 900. In some embodiments, at least a first portion of the first contextual information is received from one or more sensors (e.g., of the device(s) implementing method 900 and/or connected/peripheral devices). For example, the one or more sensors may include image sensors (e.g., cameras), audio sensors (e.g., microphones), motion sensors (e.g., accelerometers, gyroscopes, magnetometers, etc.), GPS, infrared sensors, light sensors, temperature sensors, biometric sensors, and the like, for capturing and/or streaming context information from the environment.

In some embodiments, the first contextual information may include user data, such as usage history, user settings or authorizations, user profile information, current biometric data (e.g., gaze tracking, workout statistics), and so forth. In some embodiments, the first contextual information may include current device context. In some embodiments, the current device context may include user interface information, such as information indicating the elements, functionality, or status of a user interface of the device(s) implementing method 900 (e.g., as described in further detail with respect to FIGS. 12A-13B, below), and/or information provided by or obtained from an application installed or running on the device(s) implementing method 900. For example, the current device context may indicate the current device connectivity (e.g., the current WiFi network, connected devices such as smart home devices or other peripherals, etc.), the current or recent status of a device or application event (e.g., an alarm going off, a message or call being received, recently-invoked keywords, etc.), currently available functions, and so forth.

At block 904, a first set of one or more keywords is selected based on the first contextual information. For example, the first contextual information may be used to select keywords that are relevant to the current context and/or likely to be invoked by a user for voice control to activate, while keywords that are not relevant to the current context and/or are unlikely to be invoked by the user are not selected to include in the active set.

For example, as discussed with respect to FIGS. 8A-8B, the keywords "stop" and "snooze" may be selected based on contextual information indicating that an alarm is currently going off, as they may to be used to respond to the alarm, but may be deactivated once the alarm is no longer going off. As another example, contextual information indicating that a connected smart thermostat is set to a lower-than-usual temperature may support the selection of the keyword "raise the temperature," as the keyword may be invoked to control the smart thermostat. As another example, contextual information indicating that the user is in a noisy environment may support the selection of the user's name and/or "excuse me" as active keywords, as the user may utilize the device(s) implementing method 900 to provide a secondary output (e.g., a haptic "nudge") to alert the user if those keywords are detected. As another example, contextual information indicating that the user has recently invoked several active keywords for media control (e.g., "play music" and "raise the volume") may support the selection of those recently-used keywords and/or additional keywords for media control (e.g., "next song," "previous song," "stop," etc.).

In some embodiments, one or more keywords of the first set of keywords are selected from a plurality of keywords (e.g., a keyword vocabulary). In some embodiments, the plurality of keywords (e.g., keyword vocabulary) includes the words and phrases that a user can, in certain contexts, utter to directly (e.g., without engaging a digital assistant or other full-scale NLP system) invoke keyword-enabled actions, as described herein. For example, the plurality of keywords may be a designated vocabulary of words and phrases for voice control of system functionality (e.g., keyword-enabled actions, such as snoozing an alarm, changing the volume of media playback, declining a phone call, and so forth), which may be relatively limited in size compared to a full natural-language vocabulary. As the keyword vocabulary may be relatively limited in size, in some embodiments, confusable words corresponding to keywords in the plurality of keywords may be determined to aid in keyword recognition (e.g., at block 908). For example, words or phrases within a one or two area phonetic distance from a keyword in the keyword vocabulary may be designated as confusable words for said keyword (such as "shop" and "stock" for the keyword "stop").

In some embodiments, the plurality of keywords (e.g., keyword vocabulary) may include predetermined keywords, for instance, for the default functionality of a digital assistant system, first-party applications, and/or an operating system of the device(s) implementing method 900. For example, the plurality of keywords may include "repeat" and "stop" for a timer; "stop" and "snooze" for an alarm; "stop," "next song," "previous song," "skip song," "volume up," and "volume down" for media playback; "who's calling," "pick up," and "decline" for a phone call; "open" and "dictate" for messaging; and so forth.

In some embodiments, the plurality of keywords (e.g., keyword vocabulary) may include keywords obtained from one or more applications, for instance, implementing a keyword API to allow third-party applications to register keywords for their content and functionality. For example, a home automation application may register keywords such as "raise the temperature," "lower the temperature," "turn on," "turn off," "lock," and "unlock"; a workout application may register keywords such as "start workout," "end," "pause," "change workout," and "record route"; and so forth to the keyword vocabulary.

In some embodiments, the plurality of keywords (e.g., keyword vocabulary) may include user-specific keywords, such as keywords automatically added to a keyword vocabulary for a specific user based on past utterances by the specific user. For example, on a system implementing a digital assistant (e.g., digital assistant system 700), in response to a natural-language utterance including a digital assistant trigger phrase, such as "Hey Assistant, make it loud," the digital assistant system may use large-vocabulary speech recognition (LVCSR) techniques (e.g., a second language model, as discussed below) to interpret the user request. In response to determining that the interpreted request satisfies keyword criteria—for instance, that the requested action is already a keyword-enabled action, that the requested action is appropriate for keyword enablement, and/or that a portion of the natural-language utterance specifying the action request is of appropriate keyword form (e.g., sufficiently short or clear)—the portion of the natural-language utterance specifying the action request (e.g., "make it loud") may be automatically added to a keyword vocabulary. For example, upon determining that turning up the volume of media playback is already keyword-enabled (e.g., the keyword "volume up" is already included in the keyword vocabulary), "make it loud" can be added to the keyword vocabulary as a future candidate for selection (e.g., activation) at block 904, along with (or in addition to) any predetermined or application-designated keywords for the same action (e.g., "volume up"). By automatically making previously-used words and phrases that correspond to keyword-enabled actions available as keywords, invocation of those keyword-enabled actions can be made even more intuitive and efficient for a particular user.

In some embodiments, selecting the first set of keywords includes determining a first available action based on the first contextual information, and selecting at least one keyword of the first set of keywords corresponding to the first available action. In some embodiments, determining the first available action based on the first contextual information includes selecting the first available action from a set of one or more keyword-enabled actions (e.g., actions corresponding to one or more keywords of the plurality of keywords) based on the first contextual information.

For example, if the first contextual information indicates that a connected smart light device (e.g., a smart light switch or outlet) is currently in an "off" state, the system may determine that the action of turning on the light is available for performance, but the action of turning off the light is not available for performance, and accordingly select the keyword "turn on" but not the keyword "turn off" for control of the smart light device. As another example, if the first contextual information indicates that the device(s) implementing method 900 are currently playing back music from a playlist, the system may determine that the actions of stopping playback, navigating between songs, and controlling the volume are available for performance, and accordingly select the keywords "stop," "previous song," "next song," "volume up," "make it loud," and "volume down." On the other hand, if the first contextual information indicates that the device(s) implementing method 900 are currently playing back a podcast, the action of navigating between songs is not available for performance, but the keywords "stop," "volume up," "make it loud," and "volume down" may still be selected, as the corresponding actions of stopping playback and/or changing the volume are available for performance.

In some embodiments, determining the first available action includes determining whether the first available action satisfies attention criteria. In these embodiments, the first contextual information may include information indicating the user's attention, such as image data (e.g., as described with respect to FIGS. 10A-11B), gaze- or head-tracking data (e.g., as described with respect to FIGS. 12A-13B), interaction data, and the like. For example, if contextual information indicates that a text message was received and a banner notification displayed while the user was looking at the display (e.g., based on gaze-tracking data), the action of opening the text message may be determined to satisfy attention criteria and the keyword "open" selected. On the other hand, if the contextual information indicates that the user would not have seen the banner notification (e.g., because the user was not looking at the display; because the displaying device was in a face-down position; etc.), the action of opening the text message may be determined to not satisfy the attention criteria, and the keyword "open" omitted from the first set of keywords.

In some embodiments, in addition to at least one keyword selected based on the first contextual information, the first set of keywords includes at least one global keyword. For example, the global keyword may be an "always on" keyword that is active in all contexts, and selected by default to include in the first set of keywords in addition to the contextually-active keywords. For example, the keywords "help" and "what can I say?," for receiving assistance with the voice control system, may be global keywords included in the first set of keywords in order for a user to receive assistance at any time.

Figures 10A, 10B:
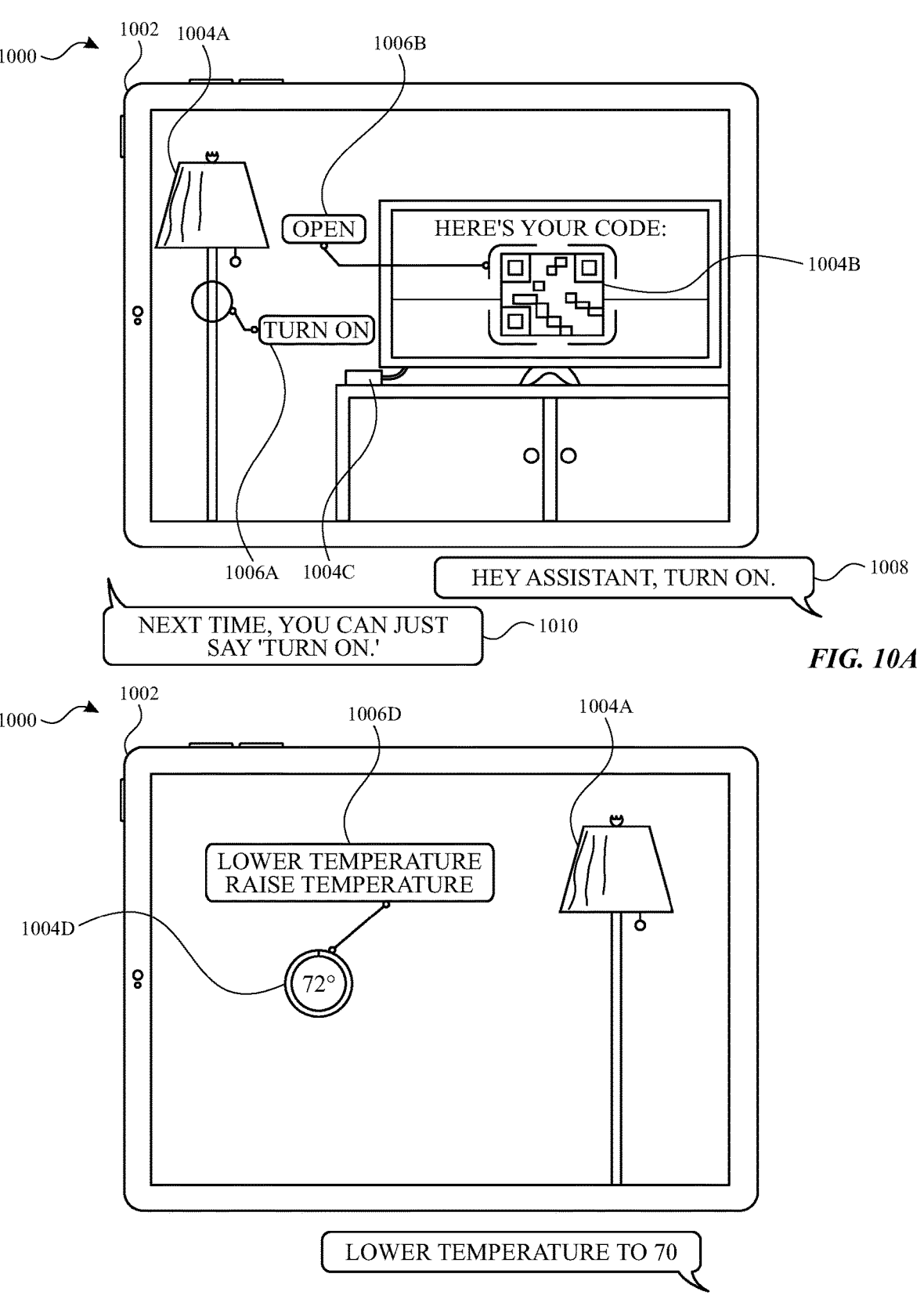
FIGS. 10A-10B illustrate a system for environmental voice control with selected keywords, according to various examples.

In some embodiments, method 900 includes providing an output indicating at least a portion of the first set of one or more keywords (e.g., indicating currently active keywords to the user). For example, the output may include a visual output, such as a displayed list of active keywords or keywords displayed with visual context (e.g., as illustrated in FIGS. 10A-10B, where active keywords are displayed proximate to corresponding interactive elements). As another example, the output may include an audio output, such as a recited list of active keywords or a natural-language voice output with keyword suggestions (e.g., "You can say 'turn on' to turn on the lights"). In some embodiments, the output indicating at least a portion of the first set of one or more keywords may be provided in response to selecting the first set of keywords. For example, if an incoming call is being received, an output such as "You can say 'Answer it' or 'Voicemail'" may be provided to indicate that keywords for responding to the incoming call have been activated.

In some embodiments, the output indicating at least a portion of the first set of one or more keywords may be provided in response to receiving a user input requesting assistance. For example, the user input may be a speech input including an (active) keyword such as "what can I say?" (e.g., such that providing the output is be performed as part of block 910 (performing the first action in accordance with a determination that the speech input includes at least one keyword of the set of one or more keywords)). As another example, the user input may be an input (e.g., a touch input, gesture input, button input) selecting a help affordance of a user interface (e.g., a question mark icon or "help" button).

At block 906, a speech input is received. For example, the received speech input may be any audio signal detected using a microphone or other audio sensor of the device(s) implementing method 900 and/or peripheral device(s), such as an utterance from a user of the device(s) implementing method 900 or other detected speech (e.g., an announcement from an intercom, an utterance from another person, ambient noise, etc.). In some embodiments, the speech input may be received along with an additional user input (e.g., a button press to invoke a digital assistant). In some embodiments, the speech input may be received without any additional user inputs.

At block 908, method 900 determines whether the speech input includes at least one keyword of the first set of one or more keywords. For example, as illustrated in FIG. 8A, system 800 listens for speech inputs including at least one of the set of active keywords "stop," "snooze," and "turn on." As another example, as illustrated in FIG. 8B, system 800 listens for speech inputs including at least one of the set of active keywords "stop," "next song," "previous song," "skip song," "volume up," "volume down," and "turn on." As another example, for a user in a noisy environment, the system may listen for speech inputs including either the user's name or the phrase "excuse me." On the other hand, in some embodiments, block 908 does not include determining whether keywords not included in the first set of one or more keywords are included in the speech input, as the system ignores (e.g., does not listen for or respond to) inactive keywords.

In some embodiments, determining whether the speech input includes at least one keyword of the first set of one or more keywords (e.g., the active keywords) is performed using a first language model. For example, the first language model may be a limited-vocabulary ASR system, which is capable of recognizing words and phrases from a limited vocabulary (e.g., the keyword vocabulary), but does not perform full-scale NLP (e.g., interpreting the speech input in view of a much larger natural-language vocabulary and grammar). Accordingly, even in embodiments that include a large-vocabulary speech recognition (LVCSR) system capable of recognizing and understanding relatively unrestricted natural language inputs (e.g., as part of a digital assistant system such as digital assistant system 700), blocks 906-908 may be performed without engaging the LVCSR system.

In some embodiments, determining whether the speech input includes at least one keyword of the first set of keywords includes extracting a set of acoustic features (e.g., speech parameters) from the speech input, e.g., using the ASR system of the first language model. In these embodiments, based on the set of acoustic features, one or more confidence scores are determined, each representing the likelihood that the speech input includes a respective keyword of the first set of keywords, and a determination of whether the confidence score satisfies confidence criteria is made. Accordingly, a determination that the speech input includes the at least one keyword of the first set of keywords may be made in accordance with a determination that the confidence score(s) corresponding to the at least one keyword satisfies the confidence criteria. For example, the confidence criteria may include a requirement that a confidence score exceed an overall confidence threshold (indicating sufficient confidence that the speech input included the corresponding keyword) and/or a requirement that a confidence score exceed any other confidence scores by a threshold margin (indicating sufficient confidence that the speech input included one keyword and not another). In some embodiments, the set of acoustic features, the confidence scores, and/or any other initial speech processing data is stored for later use (e.g., in block 910).

In some such embodiments, as the acoustic features are only used to determine whether the relatively small first (e.g., active) set of one or more keywords have been uttered, the set of extracted acoustic features (e.g., speech parameters) may be relatively small (e.g., compared to a set of acoustic features extracted for an LVSCR system) and still produce accurate recognition results at block 908. For example, while a digital assistant implementing full-scale NLP may extract additional acoustic features to distinguish speech directed at the digital assistant from background noise (e.g., speech coming from a television) and/or speech not directed at the digital assistant (e.g., speech directed at another person in the room), because the first set of keywords have already been determined as likely speech inputs for voice control of a device (e.g., words and phrases likely to be directed at the device) based on the current context, that additional distinguishing step (and the necessary acoustic features) can be omitted. As another example, the extracted acoustic features may be limited (e.g., targeted) to acoustic features useful for distinguishing the active keywords from predetermined confusable words (e.g., determined as described above). Accordingly, determining whether the speech input includes at least one keyword of the first set of keywords may be performed with relatively low latency and power usage compared to performing unrestricted speech recognition.

In accordance with a determination that the speech input includes at least one keyword of the set of one or more keywords, at block 910, a first action is performed. In some embodiments, the first action corresponds to the at least one keyword included in the speech input. For example, while an alarm is going off, if the keyword "stop" is detected in the speech input, the corresponding action of turning off the alarm is performed. As another example, while a user is in a noisy environment, if the keyword "excuse me" is detected in the speech input, the corresponding action of providing an attention-getting output to the user (e.g., notifying the user that someone may be trying to get their attention) is performed.

In some embodiments, performing the first action includes determining, using a second language model, at least one word included in the speech input. For example, if the keyword "dictate" is detected while active, performing the action of dictating may include engaging the second language model to determine the text to transcribe from the speech content following the detected keyword "dictate." As another example, a keyword such as "start <type> workout" may be predetermined to require a type parameter (e.g., "start running workout," "start yoga workout," etc.), and the second language model may be engaged to interpret the type parameter in response to detecting the keyword. In some embodiments, using the second language model to determine the other word is performed in response to determining that the speech input includes speech content that does not correspond to the one or more detected active keywords. For example, as illustrated in FIG. 8A, for the speech input "Snooze for 15 minutes," the active keyword "Snooze" and corresponding first action of snoozing an alarm can be determined from the first portion of the speech input, but the second language model may be engaged to determine whether the user specified an optional parameter for the action of snoozing in the remaining portion of the utterance.

In some embodiments, the second language model may include a large-vocabulary speech recognition (LVCSR)/NLP system capable of recognizing and understanding relatively unrestricted natural language inputs. For example, the LVCSR system may be included as part of a digital assistant system (e.g., digital assistant system 700) for use recognizing user speech and/or determining user intents to provide a response (e.g., as discussed above with respect to the speech input "Hey Assistant, make it loud"). In some embodiments, the second language model may re-use the set of extracted acoustic features, confidence scores, and/or other pre-processing data produced when performing the determination of block 908. For example, for the speech input "Snooze for 15 minutes," although the portion of the speech input "for 15 minutes" would be determined at block 908 to not include a keyword of the first set of keywords, the extracted acoustic features corresponding to that portion of the speech input may be passed to the LVCSR system for use in interpreting additional words.

In some embodiments, in accordance with a determination that the speech input includes a trigger word in addition to the at least one keyword of the first set of one or more keywords (e.g., both a trigger word and an active keyword), an output is provided (e.g., an audio output such as a speech output, a visual output, etc.), indicating that performance of the first action can be caused with the at least one keyword and without the trigger word. For example, a trigger word may be a phrase such as "Hey Assistant" that a user can utter to initiate a digital assistant session (e.g., of digital assistant system 700), which may implement an LVCSR system to interpret and respond to relatively unstructured natural-language inputs (e.g., non-keyword inputs). Accordingly, for a speech input such as "Hey Assistant, turn on," where the latter portion corresponds to the active keyword "turn on," a speech output such as "Next time, you can just say 'Turn on'" may be provided to indicate that turning on the light can be performed without the trigger word by simply using the active keyword (e.g., as illustrated in FIG. 10A).

On the other hand, in some embodiments, in accordance with a determination that the speech input does not include at least one keyword of the set of one or more keywords (e.g., that the speech input did not include an active keyword), performance of block 910 is foregone. Referring to FIG. 9B, in some embodiments, in accordance with a determination that that the speech input does not include at least one keyword of the set of one or more keywords, and further in accordance with a determination at block 912 that the speech input includes a trigger word, at block 914, a digital assistant session is initiated. For example, if the speech input includes the trigger word "Hey Assistant," a digital assistant system including an LVCSR system may be activated to interpret and respond to the instant speech input and/or subsequent speech inputs for the duration of the digital assistant session. In some embodiments, the previously-extracted acoustic features may be passed to the digital assistant system to expedite the digital assistant's interpretation of the non-active keyword speech.

Referring now to FIG. 9C, in some embodiments, at block 916, second contextual information is obtained. In some embodiments, the second contextual information may be obtained in the same manner and/or from the same sources as the first contextual information, and may represent an updated set of contextual data. In these embodiments, at block 918, a second set of one or more keywords, different from the first set of one or more keywords, is selected based on the second contextual information. In some embodiments, blocks 916-918 may be performed periodically to refresh the currently-active set of keywords, such that keywords that are currently relevant and/or likely to be uttered by a user are active (e.g., selected for the active set), while keywords that are not currently relevant and/or likely to be uttered by the user are inactive (e.g., not selected and/or deselected for the active set). For example, as discussed with respect to FIGS. 10A-10B, as a user moves and looks around a room using a device as a viewfinder (e.g., streaming visual context data), keywords may be selected for the active set as corresponding environmental elements become visible (e.g., selecting the keyword "turn on" while the user is looking at a lamp in an off-state) and deselected when the corresponding environmental elements are no longer in view (e.g., deselecting the keyword "open" for a QR code when the QR code is no longer visible).

In some embodiments, block 918 is performed in accordance with a determination that the second contextual information differs from the first contextual information. For example, while the first contextual information discussed with respect to FIG. 8A indicated that an alarm was currently going off, once the alarm is snoozed, the second (e.g., updated) contextual information discussed with respect to FIG. 8B indicates that an alarm is not currently going off. Accordingly, a second set of keywords that does not include the keywords "stop" and "snooze" for the alarm may be selected, as the second contextual information no longer supports that those keywords are relevant and/or likely to be used. Likewise, with respect to FIGS. 8A-8B, as the second contextual information indicates that media playback is has begun (e.g., in the time since the first set of keywords were selected), a second set of keywords including "stop," "next song," "previous song," "skip song," "volume up," "volume down," and "turn on" for controlling the media playback may be selected.

In these embodiments, at block 920, a second speech input is received, and, at block 922, a determination is made whether the second speech input includes at least one keyword of the second set of one or more keywords. In some embodiments, block 922 may be performed as generally described with respect to block 908, but with respect to the second set of keywords (e.g., the updated, currently-active set of keywords) rather than the first set of keywords (e.g., the previously-active set of keywords). For example, as described with respect to FIGS. 8A-8B, because the keyword "snooze" for the alarm is not included in the second (e.g., updated) set of keywords (e.g., because the alarm is no longer going off), block 922 will not include determining whether the keyword "snooze" was uttered by the user (e.g., the system will not "listen" for inactive keywords).

In some embodiments, at block 924, in accordance with a determination that the second speech input includes at least one keyword of the second set of one or more keywords, a second action is performed. For example, as described with respect to FIG. 8B, as the keyword "volume down" has been selected based on the context that media playback is occurring, the action of turning down the volume of the media playback will be performed if the keyword "volume down" is detected in a speech input. On the other hand, if a determination is made that the received second speech input does not include at least one keyword of the second set of one or more keywords-even if the user did utter an inactive keyword-a second action is not performed.

The method described above with reference to FIGS. 9A-9C are optionally implemented by components depicted in FIGS. 1-4, 6A-6B, 7A-7C, and 8A-8B. For example, the operations of method 900 may be implemented by one or more electronic devices (e.g., 104, 122, 200, 400, 600, 802), such as one implementing system 700. For example, the operations of method 900 may be implemented using a cell phone, tablet, laptop, smart TV, smart speaker, smart watch, headset, smart glasses, and/or the like. It would be clear to a person having ordinary skill in the art how other processes are implemented based on the components depicted in FIGS. 1-4, 6A-6B, 7A-7C, and 8A-8B.

FIGS. 10A-10B illustrate system 1000 for providing environmental voice control with selected keywords, according to various examples. System 1000 is implemented, for example, using one or more electronic devices implementing a digital assistant (e.g., digital assistant system 700). In some examples, system 1000 is implemented using a client-server system (e.g., system 100), and the functions of system 1000 are divided up in any manner between the server (e.g., DA server 106) and a client device. In other examples, the functions of system 1000 are divided up between the server and multiple client devices (e.g., a mobile phone and a wearable computing device or other peripheral device). Thus, while some functions of system 1000 are described herein as being performed by particular devices of a client-server system, it will be appreciated that system 1000 is not so limited. In other examples, system 1000 is implemented using only a client device (e.g., user device 104) or only multiple client devices. In system 1000, some functions are, optionally, combined, the order of some functions is, optionally, changed, and some functions are, optionally, omitted. In some examples, additional functions may be performed in combination with the system 1000.

Referring to FIG. 10A, in order to select keywords (e.g., words or phrases that can be uttered by a user) for environmental voice control, device 1002 obtains environmental information (e.g., information relating to the environment of a user and/or device). The obtained environmental information includes image data, such as data streamed from a camera or other image sensor of device 1002. For example, as illustrated in FIG. 10A, the image data may be obtained when a user opens a camera application of device 1002, and may represent the user's physical environment (e.g., using the camera as a viewfinder for the environment).

In some embodiments, some or all of the obtained environmental information is received from one or more sensors (e.g., cameras, microphones, accelerometers, GPS, infrared sensors, light sensors, touch sensors, biometric sensors, etc.) of device 1002 and/or devices in communication with device 1002 (e.g., sensors of headphones, a smart watch, smart home devices, etc. connected to device 1002 via WiFi, Bluetooth, UWB, wired connections, etc.). For example, in addition to the stream of image data received from a camera of device 1002, the environmental information may include GPS data indicating that device 1002 is at a user's home address, light sensor data indicating that device 1002 is in a dark room, and so forth.

In some embodiments, the obtained environmental information includes additional application data, device data, or other contextual data (e.g., as described above with respect to FIGS. 8A-9C). For example, as illustrated in FIG. 10A, the environmental information may include connection information indicating that device 1002 is connected to a home WiFi network, location information indicating that device 1002 is at the user's home address, information from a home automation application about connected smart devices such as lamp 1004A, television device 1004C, speakers, locks, and so forth.

Based on the environmental information, one or more interactive elements are identified. In some embodiments, interactive elements may be elements of the real or virtual environment that device 1002 can interact with either directly or indirectly. For example, as illustrated in FIG. 10A, device 1002 may be able to directly interact with other electronic devices, such as lamp 1004A or television device 1004C, using a home automation system that communicates with and/or controls the devices over a wireless or wired network. As another example, device 1002 may be able to indirectly interact with other elements of the environment, such as accessing a link or other information encoded by QR code 1004B.

In some embodiments, identifying the interactive element(s) includes determining an identity of an interactive element based on the image data included in the environmental information. For example, image recognition techniques may be used to recognize QR code 1004B from the image data alone. As another example, lamp 1004A and television device 1004C may be recognized from the image data (e.g., using a visual ontology for lamps and television devices) and additional environmental information received from a home automation system (e.g., identifying the detected lamp and television device as specific connected devices, and therefore, as elements that can be interacted with using the home automation system).

Once the one or more interactive elements are identified, a first set of one or more keywords is selected, including at least one keyword that corresponds to at least one identified interactive element. For example, referring to FIG. 10A, the first set of keywords may include "turn on," corresponding to the identified interactive element lamp 1004A, and "open," corresponding to the identified interactive element QR code 1004B. In some embodiments, the first set of keywords is selected from an overall keyword vocabulary, which may include default system keywords, keywords for application functionality, and so forth. For example, the keyword "open" for QR codes may be included in the overall keyword vocabulary as part of the default functionality of system 1000, while the keywords "turn on" and "turn off" for smart light devices may be added to the overall keyword vocabulary by a smart home application (e.g., upon installation or update of the smart home application, or when the user registers a smart light device with the smart home application).

In some embodiments, selecting the first set of one or more keywords is performed based on the first environmental information. For example, as discussed with respect to FIGS. 8A-9C, the first environmental information may be used to determine whether keywords are relevant to and/or likely to be invoked by the user in the current environment.

In some embodiments, selecting the first set of keywords includes determining whether an action is available for performance with respect to the first interactive element and selecting a keyword corresponding to the available action to activate. For example, if light sensor data and/or status data from a home automation application indicate that lamp 1004A is in an "off" state, system 1000 may determine that an action to turn on the light is currently available for performance, and accordingly select the keyword "turn on" (corresponding to turning on the light) for the first set of keywords. As another example, if device 1002 is connected to the internet, system 1000 may determine that an action to open a web link encoded by a QR code is currently available for performance, and accordingly select the keyword "open" (corresponding to opening the QR code link in a web browser) for the first set of keywords. On the other hand, if television device 1004C is not currently playing back any media, system 1000 may determine that no actions are currently available for performance, even if system 1000 can perform actions such as turning volume up or down or pausing or playing media when media playback is occurring.

In some embodiments, selecting the first set of one or more keywords includes determining whether the first interactive element satisfies attention criteria. For example, in FIG. 10A, where the user is using the camera application as a "viewfinder" for the environment, the image data captured by the camera and/or the portion of the image data displayed by device 1002 may be approximate the user's field of view, and thus, interactive elements included in the image data may satisfy attention criteria. As another example, a front-facing camera or other image sensor of device 1002 may be used to perform gaze detection (e.g., determining where the user is looking) in order to determine whether the user is looking at the display of device 1002 (e.g., the specific interactive elements in the user's field of view that the user is paying attention to).

In some embodiments, system 1000 provides an output indicating at least a portion of the first set of keywords (e.g., the currently active keywords). For example, as illustrated in FIG. 10A, device 1002 displays output 1006A, indicating that active keyword "turn on" corresponding to the interactive element lamp 1004A is available, and output 1006B, indicating that the active keyword "open" corresponding to the interactive element QR code 1004B is available. In some embodiments, the output indicating the portion of the first set of keywords is provided in response to receiving a user input requesting assistance. For example, output 1006A and output 1006B may be displayed in response to detecting a speech input including the keyword "what can I say?," a touch input selecting a help affordance (e.g., a question mark icon displayed by the camera application), a predetermined gesture input (e.g., a swipe input, press-and-hold input, scratch input, etc.) for invoking help, or the like.

As illustrated in FIG. 10A, system 1000 receives speech input 1008, "Hey Assistant, turn on." For example, speech input 1008 may be received via a microphone of device 1002 or of a different connected device, such as a smart watch, speaker, headphones, or the like. Upon receiving speech input 1008, system 1000 determines whether speech input 1008 includes at least one keyword of the selected first set of keywords (e.g. whether the user has uttered an active keyword). In some embodiments, determining whether speech input 1008 includes at least one keyword of the selected first set of keywords is performed as described above with respect to FIGS. 8A-9C. For example, determining whether speech input 1008 includes an active keyword may be performed by a first language model, such as a limited-vocabulary ASR system that can detect the first set of keywords without performing full-scale NLP.

In response to determining that speech input 1008 includes at least one keyword that is included in the first set of keywords (e.g., upon determining that the user uttered an active keyword), system 1000 causes an action to be performed with respect to the interactive element corresponding to the at least one keyword. For example, upon recognizing that the user has uttered the keyword "turn on," system 1000 causes the corresponding interactive element, lamp 1004A, to be turned on (e.g., using a smart home application to transmit an instruction to a smart light switch or power outlet to turn on lamp 1004A).

In some embodiments, system 1000 may determine whether speech input 1008 includes speech that does not correspond to a recognized active keyword, and in particular, whether speech input 1008 includes a trigger word. For example, in addition to including the active keyword "turn on," speech input 1008 includes the trigger word "Hey Assistant" (e.g., for invoking a digital assistant of device 1002). In response, device 1002 may output speech output 1010, "Next time, you can just say 'turn on,'" indicating that the action of turning on a light can be invoked by the keyword "turn on" alone, without needing to preface the command with the trigger word.

Alternatively, in some embodiments, if system 1000 had instead determined that speech input 1008 does not include any keywords of the first set of keywords, system 1000 foregoes performance of an action in response to speech input 1008. That is, system 1000 only responds to active keywords. For example, even if speech input 1008 included a different keyword from the overall keyword vocabulary (e.g., "volume up," corresponding to television device 1004C), if that keyword was not selected as part of the first set of contextually-active keywords (and if no active keywords are detected instead) system 1000 will not respond to the utterance.

Referring now to FIG. 10B, in some embodiments, system 1000 obtains updated environmental information including updated image data. For example, as illustrated in FIG. 10B, as the user changes the viewpoint of device 1002's camera, in addition to the updated image data streamed from the camera application representing the new field of view, system 1000 may also receive other updated sensor or context data (e.g., the new time, new location or positioning information, changes to the device state, etc.). In these embodiments, system 1000 identifies one or more interactive elements based on the updated environmental information, including at least one interactive element different from the interactive elements identified from the prior environmental information (e.g., the interactive elements identified as described in FIG. 10A). For example, by changing the viewpoint of device 1002's camera, thermostat device 1004D can be identified from the updated image data, along with lamp 1004A, which remains visible. However, QR code 1004B and television device 1004C are no longer visible from the updated image data, and may not be identified as interactive elements based on the updated environmental information.

In these embodiments, a second set of one or more keywords is selected (e.g., as described above with respect to the first set of keywords), including at least one keyword that corresponds to the newly-identified interactive element. For example, referring to FIG. 10B, the second set of keywords may include the keywords "lower the temperature" and "raise the temperature," corresponding to the identified interactive element thermostat device 1004D. As another example, "turn off" may be selected as a keyword corresponding to lamp 1004A, based on the identification of lamp 1004A from the updated image data and as status information indicating that lamp 1004A is in an "on" state. On the other hand, as QR code 1004B is no longer included in the current image data, system 1000 may refrain from selecting the keyword "open" corresponding to QR code 1004B for the second set of keywords (e.g., deactivating the previously-active keyword based on the updated environmental information).

As illustrated in FIG. 10B, in some embodiments, after selecting the second set of keywords, system 1000 receives speech input 1012, "Lower the temperature to 70." In these embodiments, system 1000 determines whether speech input 1012 includes at least one keyword of the selected second set of keywords (e.g., whether the user has uttered a currently-active keyword), for example, using the first, limited-vocabulary language model as discussed with respect to FIG. 10A.

In these embodiments, in response to determining that speech input 1012 includes at least one keyword, "Lower the temperature," which is included in the second set of keywords, system 1000 performs a second action with respect to the corresponding interactive element, thermostat device 1004D. For example, in response to detecting the active keyword "Lower the temperature," system 1000 determines that the action of causing thermostat device 1004D to lower the temperature should be performed. In some embodiments, in response to determining that speech input 1012 includes additional speech content that does not correspond to an active keyword (e.g., "to 70"), performing the first action may include using a second language model (e.g., an LVCSR system) to determine at least one additional word in speech input 1012, for instance, as described with respect to FIGS. 8A-9C, above. For example, in response to detecting the keyword "Lower the temperature" with the first language model and further determining the parameter of 70 degrees from speech input 1012 using the second language model, the action of causing thermostat device 1004D to lower the temperature setting to 70 degrees is performed.

Alternatively, in some embodiments, if system 1000 instead determines that speech input 1012 does not include any keywords of the second set of keywords, system 1000 foregoes performance of an action in response to speech input 1012. For example, even if the user had uttered a keyword that was selected for the first set of keywords (e.g., "open"), if that keyword was not selected as part of the second set of keywords (e.g., based on the updated environmental information), and if no active keywords are detected instead, system 1000 will not respond to the utterance.

The operations described above with reference to FIGS. 10A-10B are optionally implemented by components depicted in FIGS. 1-4, 6A-6B, and 7A-7C. For example, the operations of system 800 may be implemented by an electronic device (e.g., 104, 122, 200, 400, 600, 1002), such as one implementing system 700. It would be clear to a person having ordinary skill in the art how other processes are implemented based on the components depicted in FIGS. 1-4, 6A-6B, and 7A-7C.

FIGS. 11A-11B are a flow diagram illustrating method 1100 for providing environmental voice control with selected keywords. Method 1100 may be performed using one or more electronic devices (e.g., device 104, device 200, device 600, device 1002) with one or more processors and memory. In some embodiments, method 1100 is performed using a client-server system, with the operations of method 1100 divided up in any manner between the client device(s) (e.g., 104, 200, 600, 1002) and the server. Some operations in method 1100 are, optionally, combined, the orders of some operations are, optionally, changed, and some operations are, optionally, omitted.

Referring to FIG. 11A, at block 1102, first environmental information is obtained, including first image data. In some embodiments, the first environmental information may be any information useful for determining how a user might interact with the environment using the device(s) implementing method 900, and thus, for determining which keyword(s) should be activated for voice control. For example, image data included in the first environmental information may represent a user's field of view (e.g., when the image data is captured by a camera being used as a viewfinder, such as illustrated in FIGS. 10A-10B, or by a wearable electronic device), and accordingly, may be used to determine keywords relevant to what the user can currently see. As another example, connection information included in the first environmental information (e.g., currently connected networks, currently connected devices, etc.) may be used to determine keywords relevant to functionality the device(s) implementing method 900 can presently access. In some embodiments, the first environmental information includes attention information, such as gaze tracking data, head tracking data, interaction data, or the like.

In some embodiments, at least a first portion of the first environmental information is received from one or more sensors (e.g., of the device(s) implementing method 1100 and/or connected/peripheral devices). For example, the one or more sensors may include image sensors (e.g., cameras), audio sensors (e.g., microphones), motion sensors (e.g., accelerometers, gyroscopes, magnetometers, etc.), GPS, infrared sensors, light sensors, temperature sensors, biometric sensors, and the like, for capturing and/or streaming context information from the environment. In some embodiments, the first environmental information further includes device, application, and/or user information (e.g., as described with respect to the contextual information of FIGS. 8A-9C). For example, the first environmental information may further include user interface information (e.g., the content and functionality of a user interface currently being provided by the device(s) implementing method 1100, virtual environmental information (e.g., virtual elements currently present in a virtual reality, mixed reality, or augmented reality environment), a user profile (e.g., indicating usage history, preferences, interests, etc.), or the like.

At block 1104, based on the first environmental information, one or more interactive elements are identified. In some embodiments, at least one of the interactive elements is an element of the real (e.g., physical) environment. For example, real-world interactive elements may include real-world electronic devices that the device(s) implementing method 1100 can interact with or control, or real-world objects, people, text, symbols, locations, and so forth that the device(s) can recognize. In some embodiments, at least one of the interactive elements is an element of a virtual environment. For example, virtual interactive elements may include elements of a user interface and/or of a virtual-, mixed-, or augmented-reality environment currently being provided by the device(s) implementing method 1100.

In some embodiments, identifying the first interactive element includes determining an identity of the first interactive data based on the first image data. For example, image recognition techniques may be used to detect currently-visible objects (e.g., electronic devices, houseplants, car keys, etc.), people, text, symbols (e.g., QR codes, digital mapping markers, etc.), locations (e.g., map locations, buildings, rooms in a house, etc.), and so forth from the first image data using a visual ontology or other visual classification method. As another example, as illustrated in FIG. 10A, electronic devices such as a lamp and a television device can be recognized from the image data (e.g., as a lamp and a television device) and further identified as specific instances of a smart light device and a television device using additional environmental information (e.g., WiFi or other connection information, location information, smart home settings, user authorizations, etc.). As a further example, the first image data may be used to determine and/or orient a field of view of a computer-generated reality (CGR) environment (e.g., a virtual-, mixed-, or augmented-reality environment), and thus determine which virtual elements of the CGR environment are currently visible to a user.

At block 1106, a first set of one or more keywords is selected, wherein the first set of one or more keywords includes at least a first keyword corresponding to a first interactive element of the one or more identified interactive elements. For example, as illustrated in FIG. 10A, the selected keywords may include the keyword "turn on" corresponding to a lamp and the keyword "open" corresponding to a QR code. As another example, the keyword "call" may be selected corresponding to identified text including a phone number, the keyword "search" or "what's this?" may be selected corresponding to a recognized object such as a house plant, the keyword "delete" or "move" may be selected corresponding to a virtual object, and so forth. In some embodiments, in addition to at least a first keyword corresponding to a first interactive element, the first set of keywords includes at least one global keyword (e.g., an "always on" keyword), such as the keywords "help" or "what can I say?" for receiving assistance with the voice control system (e.g., invoking the output indicating a portion of active keywords corresponding to the present interactive elements, so the user can determine what can be interacted with).

In some embodiments, one or more keywords of the first set of keywords are selected from a plurality of keywords. For example, the plurality of keywords may be a very small vocabulary of words and phrases when compared to a typical natural-language vocabulary, allowing the device(s) implementing method 1100 to detect the relatively limited first set of keywords without invoking full natural-language processing capabilities (e.g., as described with respect to the first language model discussed herein). In some embodiments, the plurality of keywords may include keywords obtained from one or more applications, for instance, implementing a keyword API to allow applications to register keywords for their content and functionality. For example, a home automation application may register keywords such as "raise the temperature," "lower the temperature," "turn on," "turn off," "lock," "unlock," or other keywords for controlling the functionality of connected electronic devices. As another example, a CGR application may register keywords corresponding to CGR elements, such as elements of a heads-up display (HUD), virtual objects, and/or real objects that the CGR application can interact with.

In some embodiments, selecting the first set of one or more keywords is performed based on the first environmental information. In these embodiments, the first environmental information may be used to determine whether keywords are relevant to and/or likely to be invoked by the user in the current environment, and to omit keywords that are not currently relevant or not as likely to be uttered, e.g., as described with respect to FIGS. 8A-9C. For example, if the first environmental information indicates that the environment is dark, or that the user typically turns on the lights around the current time, the keyword "turn on" may be selected corresponding to a smart light device, as the environmental information indicates that the user may want to interact with the smart light device to turn it on. On the other hand, if the first environmental information indicates that the environment is bright, or that the smart light device typically remains in an off state around the current time, the keyword "turn on" may not be selected, as the environmental information indicates that the user is unlikely to want to turn on the smart light device.

In some embodiments, selecting the first set of one or more keywords includes determining whether the first interactive element satisfies attention criteria, for instance, based on the first environmental information (e.g., the image data and/or other attention information, such as gaze tracking data). In these embodiments, in accordance with a determination that the first interactive element satisfies the attention criteria, a keyword corresponding to the first interactive element is selected for the first (e.g., active) set of keywords. For example, the attention criteria may include a requirement that the user is looking at or near an interactive element, which may be determined using gaze tracking data or head tracking data. Accordingly, if gaze tracking data or head tracking data indicates that the user is looking at a particular portion of an environment (e.g., a real or CGR environment) or a user interface, interactive elements falling within that particular portion may satisfy the attention criteria, while interactive elements falling outside of that particular portion may not satisfy the attention criteria. As another example, as illustrated in FIGS. 10A-10B, the image data may be assumed to approximate the user's field of view, such that interactive elements recognized from the image data satisfy the attention criteria.

In some embodiments, selecting the first set of one or more keywords includes determining whether at least one action is available for performance with respect to the first interactive element, and in accordance with a determination that the at least one action is available, selecting a keyword corresponding to the available action. For example, as illustrated in FIG. 10A, as the lamp is in an off state, the action of turning on the lamp is available, the corresponding keyword "turn on" can be selected for the first set of keywords. On the other hand, as illustrated in FIG. 10A, as the television device is not currently playing back media, actions for controlling media playback (e.g., stopping, playing, raising or lowering the volume, etc.) are not available for the television device, and accordingly, corresponding keywords for those unavailable actions are not selected.

In some embodiments, method 1100 includes providing an output indicating at least a first portion of the first set of one or more keywords (e.g., indicating currently active keywords to the user). In some embodiments, the output may include a visual output, such as a displayed list of active keywords or keywords displayed with visual context (e.g., as illustrated in FIGS. 10A-10B, where active keywords are displayed proximately to corresponding interactive elements). In some embodiments, the output may include an audio output, such as a recited list of active keywords or a natural-language voice output with keyword suggestions (e.g., "You can say 'turn on' to turn on the lights"). In some embodiments, the output indicating at least a portion of the first set of one or more keywords may be provided in response to receiving a user input requesting assistance. For example, the user input may be a speech input including an (active) keyword such as "help," an input (e.g., a touch input, gesture input, button input) selecting a help affordance of a user interface (e.g., a question mark icon or "help" button), or the like.

At block 1108, a speech input is received, and at block 1110, method 1100 determines whether the speech input includes at least one keyword of the first set of one or more keywords. In some embodiments, the determination of whether the speech input includes at least one keyword of the first set of one or more keywords is performed as discussed with respect to blocks 906-908 of FIG. 9A, above. For example, the determination may be made using a first language model, such as a limited-vocabulary ASR system, and without performing full NLP. Accordingly, even in embodiments that include a large-vocabulary speech recognition (LVCSR) system capable of recognizing and understanding relatively unrestricted natural language inputs (e.g., as part of a digital assistant system such as digital assistant system 700), blocks 1108-1110 can be performed without engaging the LVCSR system.

In accordance with a determination that the speech input includes the first keyword of the first set of one or more keywords (i.e., the keyword corresponding to the first interactive element), at block 1112, a first action is caused to be performed with respect to the first interactive element. For example, as illustrated in FIG. 10A, if the active keyword "turn on," corresponding to the interactive element lamp 1004A, is detected, the action of turning on the interactive element lamp 1004A is caused to be performed (e.g., using home automation capabilities). As another example, if the active keyword "what's this?," corresponding to an identified house plant, is detected, the action of performing a visual search (e.g., for plants that look like the house plant) is caused to be performed. As another example, if the active keyword is "delete," corresponding to a virtual element, is detected, the action of deleting the virtual element is caused to be performed.

In some embodiments, further in accordance with a determination that the speech input includes the first keyword of the first set of one or more keywords, at least one word included in the speech input is determined, for instance, as described with respect to block 910 of FIG. 9A. For example, a second language model, such as a large-vocabulary speech recognition (LVCSR)/NLP system capable of recognizing and understanding relatively unrestricted natural language inputs, is used to interpret a parameter included in a portion of the speech input that does not correspond to an active keyword, such as "to 70" in the speech input "raise temperature to 70," or speech provided following the active keyword "dictate" (e.g., the speech to be transcribed). In some embodiments, in accordance with a determination that the speech input includes both the first keyword and a trigger word, an output is provided, indicating that performance of the first action can be caused with the first keyword and without the trigger keyword, for instance, as described with respect to block 910 of FIG. 9A.

On the other hand, in some embodiments, if no keyword of the first set of one or more keywords is detected in the received speech input (e.g., in accordance with a determination that the speech input does not include either the first keyword or another keyword of the first set of keywords), performance of block 1112 is foregone. In some embodiments, in accordance with a determination that the speech input does not include either the first keyword or another keyword of the first set of keywords, and further in accordance with a determination that the speech input includes a trigger word, a digital assistant session is initiated. For example, if the speech input includes the trigger word "Hey Assistant," a digital assistant system including an LVCSR system may be activated to interpret and respond to the instant speech input and/or subsequent speech inputs for the duration of the digital assistant session. In some embodiments, the previously-extracted acoustic features may be passed to the digital assistant system to expedite the digital assistant's interpretation of the non-active keyword speech.

Referring now to FIG. 11B, in some embodiments, at block 1114, second environmental information is obtained, including second image data. For example, the second environmental information may be obtained in the same manner and/or from the same sources as the first environmental information, and may represent updates to the environment, such as an updated field of view (e.g., as the user moves a camera viewfinder or a wearable electronic device) represented by the second image data. In these embodiments, at block 1116, at least one additional interactive element (e.g., other than the one or more interactive elements identified at block 1104) is identified based on the second (e.g., updated) environmental information, and at block 1118, a second set of one or more keywords is selected, including at least a second keyword corresponding to the at least one additional interactive element. For example, as illustrated in FIGS. 10A-10B, the keywords "raise temperature" and "lower temperature" are selected for the second set of keywords, corresponding to the thermostat device that came into view as the field of view of the camera viewfinder is changed, while the keyword "open," corresponding to the no-longer visible QR code, is not selected for the second set of keywords.

In these embodiments, at block 1120, a second speech input is received, and at block 1122, a determination is made whether the second speech input includes at least one keyword of the second set of one or more keywords. For example, block 1120 may be performed as generally described with respect to block 1110, but with respect to the second set of keywords (e.g., the updated, currently-active set of keywords) rather than the first set of keywords (e.g., the previously-active set of keywords). In these embodiments, at block 1124, in accordance with a determination that the second speech input includes the second keyword of the second set of one or more keywords (e.g., the keyword corresponding to the newly-identified additional interactive element), a second action is caused to be performed with respect to the at least one additional interactive element. On the other hand, if a determination is made that the received second speech input does not include at least one keyword of the second set of one or more keywords-even if the user did utter an inactive keyword-a second action is not caused to be performed.

The method described above with reference to FIGS. 11A-11B are optionally implemented by components depicted in FIGS. 1-4, 6A-6B, 7A-7C, and 10A-10B. For example, the operations of method 900 may be implemented by one or more electronic devices (e.g., 104, 122, 200, 400, 600, 1002), such as one implementing system 700. For example, the operations of method 1100 may be implemented using a cell phone, tablet, laptop, smart TV, smart speaker, smart watch, headset, smart glasses, and/or the like. It would be clear to a person having ordinary skill in the art how other processes are implemented based on the components depicted in FIGS. 1-4, 6A-6B, 7A-7C, and 10A-10B.

Figures 12A, 12B:
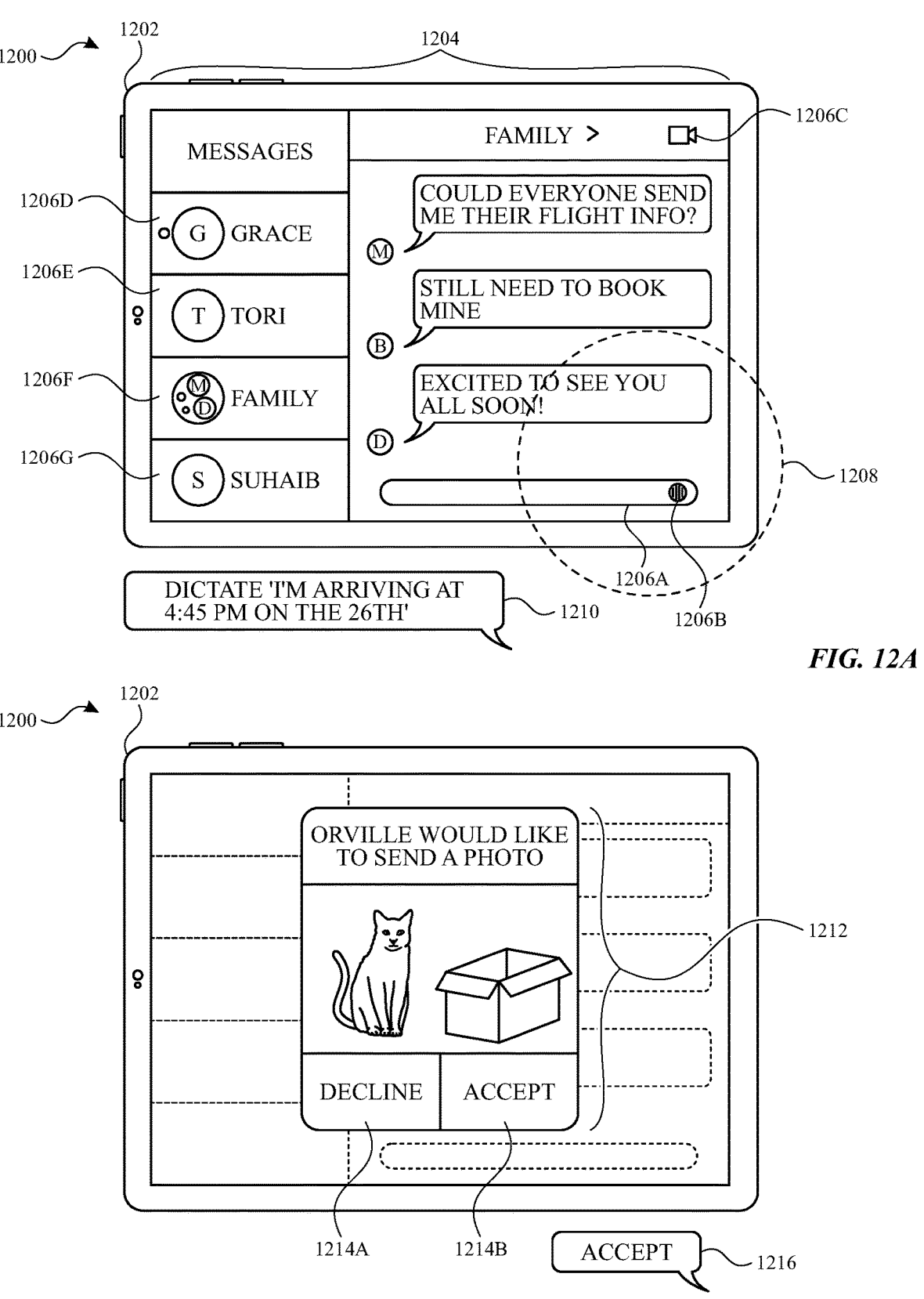
FIGS. 12A-12B illustrate a system for voice control of a user interface with selected keywords, according to various examples.

FIGS. 12A-12B illustrate system 1200 for providing voice control of a user interface with selected keywords, according to various examples. System 1200 is implemented, for example, using one or more electronic devices implementing a digital assistant (e.g., digital assistant system 700). In some examples, system 1200 is implemented using a client-server system (e.g., system 100), and the functions of system 1200 are divided up in any manner between the server (e.g., DA server 106) and a client device. In other examples, the functions of system 1200 are divided up between the server and multiple client devices (e.g., a mobile phone and a wearable computing device). Thus, while some functions of system 1200 are described herein as being performed by particular devices of a client-server system, it will be appreciated that system 1200 is not so limited. In other examples, system 1200 is implemented using only a client device (e.g., user device 104) or only multiple client devices. In system 1200, some functions are, optionally, combined, the order of some functions is, optionally, changed, and some functions are, optionally, omitted. In some examples, additional functions may be performed in combination with the system 1200.

Referring now to FIG. 12A, system 1200 displays a first user interface including one or more user interface elements. For example, as illustrated in FIG. 12A, device 1202 displays user interface 1204 for a messaging application. In some embodiments, the one or more user interface elements may include one or more input fields, such as element 1206A (a text input field for a messaging conversation). In some embodiments, the one or more user interface elements may include one or more affordances, such as buttons, links, banners, sliders, or other interactive elements. For example, user interface 1204 further includes element 1206B (a button for recording a voice message), element 1206C (a button for starting a video call), and elements 1206D-1206G (selectable menu items for various messaging conversations).

System 1200 selects a first set of one or more keywords, including at least one keyword that corresponds to at least one element of user interface 1204. In some embodiments, the first set of keywords is selected from an overall keyword vocabulary (e.g., all available keywords, including both active and inactive keywords), which may include default system keywords, keywords for application functionality, and so forth.

In some embodiments, selecting the first set of keywords includes determining whether a first action is available for performance with respect to an element of the user interface, and selecting a keyword corresponding to the first action to include in the first set of keywords. For example, the keyword "dictate" may correspond to entering text into element 1206A, the keywords "record" and/or "voice message" may correspond to selecting element 1206B to begin recording a voice message, the keywords "call" and/or "FaceTime" may correspond to selecting element 1206C to begin a video call with the current contact(s), and the keyword "open" may correspond to selecting one of elements 1206D-1206G to open the respective messaging conversation.

In some embodiments, selecting the first set of keywords includes obtaining first contextual information (e.g., as described above with respect to FIGS. 8A-9C). In these embodiments, the first contextual information may include data obtained using one or more sensors (e.g., cameras, microphones, accelerometers, GPS, infrared sensors, light sensors, touch sensors, biometric sensors, etc.) of device 1202 and/or devices in communication with device 1202 (e.g., sensors of headphones, a smart watch, smart home devices, etc. connected to device 1202 via WiFi, Bluetooth, UWB, wired connections, etc.); application data; device data; and so forth. For example, as illustrated in FIG. 12A, the contextual information may include application data indicating that a message has recently been received in the conversation represented by element 1206D.

In these embodiments, system 1200 selects a first element of user interface 1204 based on the obtained contextual information, and, in response to selecting the first element, a first keyword corresponding to the first element of user interface 1204 is selected to include in the first set of keywords. For example, as illustrated in FIG. 12A, based on contextual information indicating that a message has recently been received in the conversation represented by element 1206D, the keyword "open" for opening the conversation represented by element 1206D may be selected for the first set of keywords.

In some of these embodiments, the contextual information includes attention information, and selecting the first element of user interface 1204 includes determining, based on the attention information, whether the first element satisfies attention criteria. For example, using gaze detection techniques (e.g., tracking the user's eyes with the front-facing camera of device 1202 or another image or gaze sensor), system 1200 may include attention information indicating that the user's gaze is trained on area 1208. Accordingly, system 1200 may determine that element 1206A and element 1206B satisfy attention criteria, as the elements fall within area 1208, and thus include the keywords "dictate" (corresponding to element 1206A), "record" and/or "voice message" (both corresponding to element 1206B) in the first set of keywords (e.g., the active keywords). As another example, based on attention information indicating that a notification tone was played when the message was received in the conversation represented by element 1206D, system 1200 may determine that element 1206D satisfies attention criteria, and thus include "open" for opening the conversation represented by element 1206D in the first set of keywords. On the other hand, system 1200 may determine that elements 1206C does not satisfy the attention criteria (e.g., not falling within area 1208 and/or otherwise attracting the user's attention), and thus refrain from including the keywords "call" and/or "FaceTime" corresponding to selecting element 1206C in the first set of keywords.

As illustrated in FIG. 12A, system 1200 receives speech input 1210, "Dictate 'I'm arriving at 4:45 PM on the 26th.'" For example, speech input 1210 may be received via a microphone of device 1202 or of a different connected device, such as a smart watch, speaker, headphones, or the like. Upon receiving speech input 1210, system 1200 determines whether speech input 1210 includes at least one keyword of the selected first set of keywords (e.g. whether the user has uttered an active keyword). In some embodiments, determining whether speech input 1210 includes at least one keyword of the selected first set of keywords (e.g., "dictate," "record," "voice message," and "open") is performed as described above with respect to FIGS. 8A-9C. For example, determining whether speech input 1210 includes an active keyword may be performed by a first, limited-vocabulary ASR system that can detect the first set of keywords without performing full NLP.

In response to determining that speech input 1210 includes at least one keyword that is included in the first set of keywords (e.g., upon determining that the user uttered an active keyword), system 1200 causes an action to be performed with respect to the interactive element corresponding to the at least one keyword. For example, upon recognizing that the user has uttered the keyword "dictate," system 1200 causes dictated text to be entered into element 1206A, the text entry field of user interface 1204. In some embodiments, performing the action includes determining that speech input 1210 includes speech content that does not correspond to an active keyword and/or engaging a second language model to determine at least one other word included in speech input 1210, for instance, as described with respect to FIGS. 8A-11, above. For example, in response to detecting the keyword "dictate" with the first language model, system 1200 may engage a large-vocabulary speech recognition (LVCSR)/NLP system to interpret the remainder of speech input 1210 and accordingly transcribe the text "I'm arriving at 4:45 PM on the 26$^{th}$" into element 1206A.

Alternatively, in some embodiments, if system 1200 had instead determined that speech input 1210 does not include any keywords of the first set of keywords, system 1200 foregoes performance of an action in response to speech input 1210 (e.g., system 1200 only responds to active keywords). For example, even if speech input 1210 included a different keyword from an overall keyword vocabulary (e.g., "FaceTime"), if that keyword was not selected as part of the first set of contextually-active keywords (and if no active keywords are detected instead) system 1200 will not respond to the utterance.

Referring now to FIG. 12B, in some embodiments, system 1200 displays a second user interface, different from the first user interface, including at least a second user interface element. For example, as illustrated in FIG. 12B, device 1202 displays user interface 1212 for receiving a media file, including element 1214A (an affordance for declining the media file) and element 1214B (an affordance for declining the media file), superimposed over the visually-deemphasized user interface 1204.

In these embodiments, a second set of keywords is selected, including at least one keyword that corresponds to an element of the second user interface. In some embodiments, the second set of keywords is selected as described above with respect to the first set of keywords, for instance, based on currently available actions, updated contextual information, and/or attention criteria. For example, referring to FIG. 12B, the second set of keywords may include the keywords "decline" and "accept," corresponding to element 1214A and element 1214B, respectively. On the other hand, as the user is unable to interact with user interface 1204 while user interface 1212 is active (e.g., an input to user interface 1212 is required), the second set of keywords may not include the previously-active keywords "dictate," "record," "voice message," and "open" (and/or other potential keywords corresponding to user interface 1204).

As illustrated in FIG. 12B, in some embodiments, after selecting the second set of keywords, system 1200 receives speech input 1216, "Accept." In these embodiments, system 1200 determines whether speech input 1216 includes at least one keyword of the selected second set of keywords (e.g., whether the user has uttered a currently-active keyword), for example, using the first, limited-vocabulary language model as discussed with respect to FIG. 12A. In these embodiments, in response to determining that speech input includes an active keyword, system 1200 causes a second action to be performed with respect to a corresponding user interface element. For example, as illustrated in FIG. 12B, in response to detecting the active keyword "accept" in speech input 1216, the media file is caused to be accepted (e.g., by selecting element 1214A).

Alternatively, in some embodiments, if system 1200 instead determines that speech input 1216 does not include any keywords of the second set of keywords, system 1200 foregoes causing an action to be performed in response to speech input 1216. For example, even if the user had uttered a keyword that was selected for the first set of keywords (e.g., "dictate"), if that keyword was not selected as part of the second set of keywords, and if no active keywords are detected instead, system 1200 will not respond to the utterance.

Figure 13A:
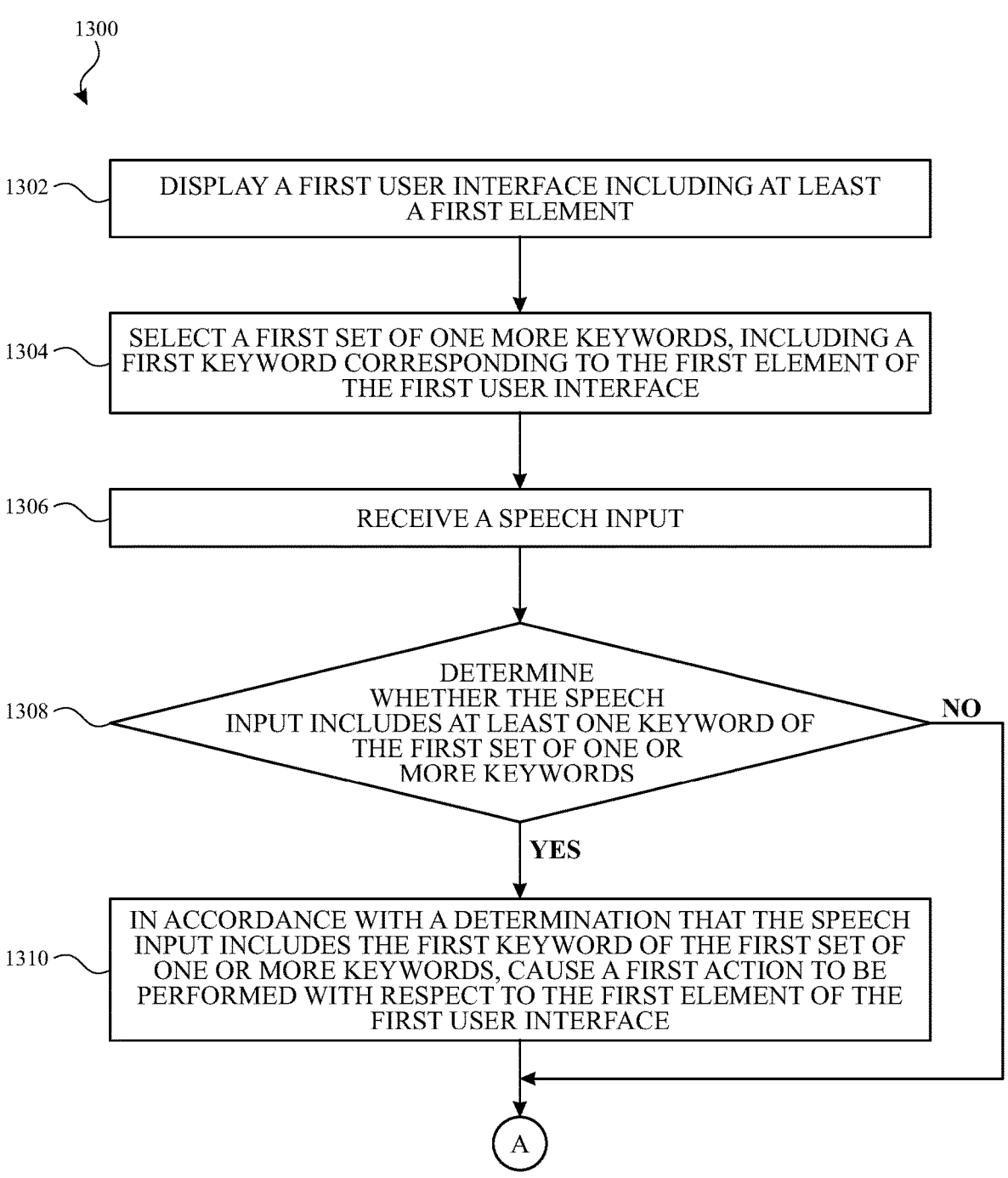
FIGS. 13A-13B illustrate a flow diagram for a method of voice control of a user interface with selected keywords, according to various examples.
Figure 13B:
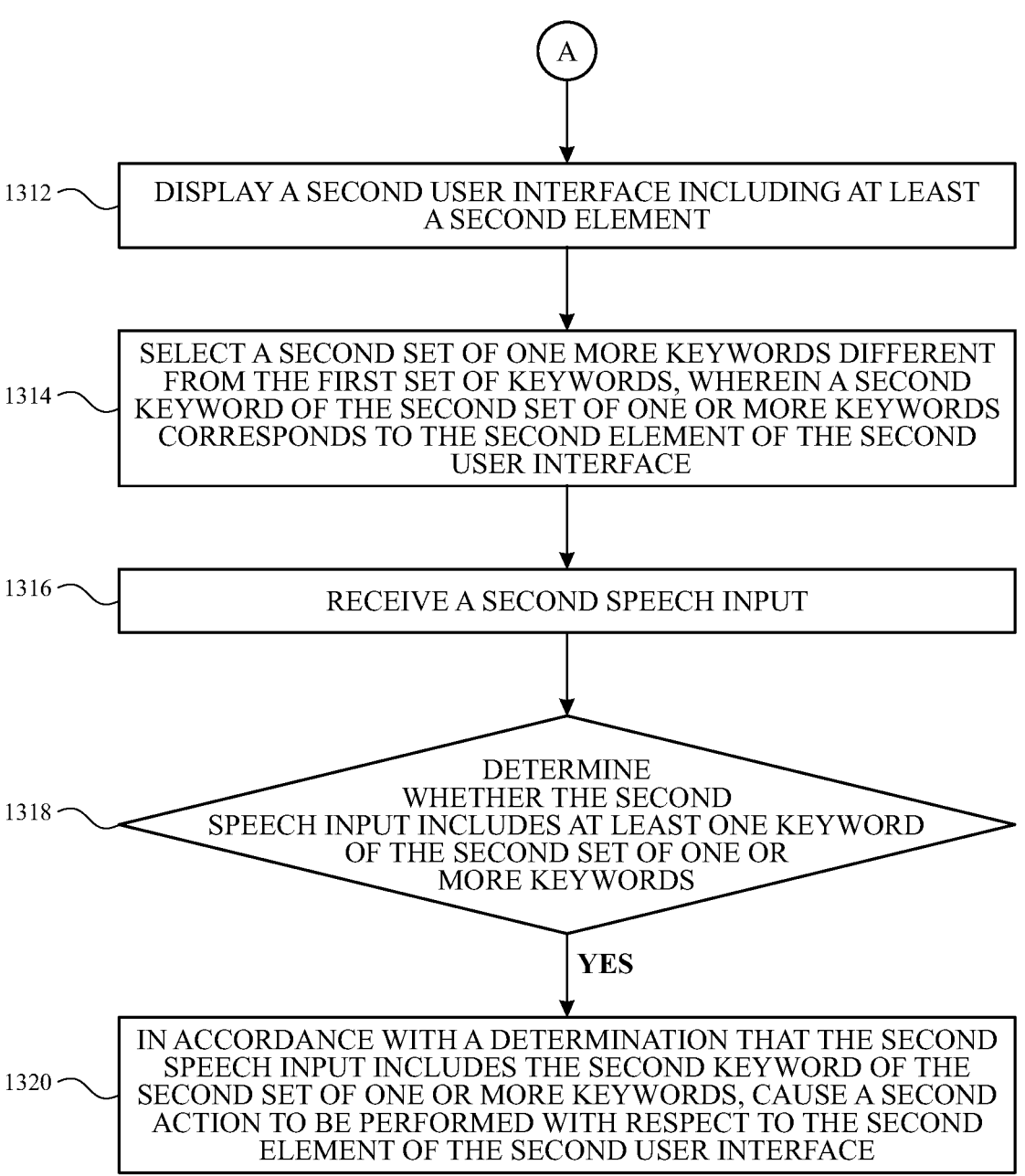

FIGS. 13A-13B are a flow diagram illustrating method 1300 for providing voice control of a user interface with selected keywords. Method 1300 may be performed using one or more electronic devices (e.g., device 104, device 200, device 600, device 1202) with one or more processors and memory. In some embodiments, method 1300 is performed using a client-server system, with the operations of method 1300 divided up in any manner between the client device(s) (e.g., 104, 200, 600, 1202) and the server. Some operations in method 1300 are, optionally, combined, the orders of some operations are, optionally, changed, and some operations are, optionally, omitted.

Referring to FIG. 13A, at block 1302, a first user interface including at least a first element is displayed. For example, the first user interface may be a user interface for an application (e.g., as illustrated in FIGS. 12A), a compulsory user interface (e.g., as illustrated in FIG. 12B), a heads-up display (e.g., for a vehicle or headset), an interactive CGR environment, or the like. In some embodiments, at least one element of the first user interface includes an affordance, such as a button, link, banner, slider, or other interactive element. In some embodiments, at least one element of the first user interface includes an input field, such as an input field for text, audio, contact information, media files, and so forth. As further examples, the first user interface may include elements such as text, images, virtual objects, and so forth.

At block 1304, a first set of one or more keywords is selected, wherein the first set of one or more keywords includes at least a first keyword corresponding to a first element of the first user interface. For example, as illustrated in FIG. 12A, the selected keywords may include the keyword "dictate" corresponding to a text field of a messaging application. As another example, the keywords "accept" and "deny" may be selected corresponding to affordances of a compulsory user interface (e.g., terms and conditions, warnings, etc.). As a further example, the keywords "delete" or "copy" may be selected corresponding to displayed text, images, virtual objects, and so forth.

In some embodiments, one or more keywords of the first set of keywords are selected from a plurality of keywords. For example, the plurality of keywords may be a very small vocabulary of words and phrases when compared to a typical natural-language vocabulary, allowing the device(s) implementing method 1300 to detect the relatively limited first set of keywords without invoking full natural-language processing capabilities (e.g., as described with respect to the first language model discussed herein). In some embodiments, the plurality of keywords may include keywords obtained from one or more applications, for instance, implementing a keyword API to allow applications to register keywords for their user interfaces. For example, a music application may register keywords such as "play," "stop," "increase volume," "decrease volume," "shuffle," "save," or other keywords for controlling the user interface of the music application, or a workout application may register keywords such as "start," "end," "pause," "change workout," "record route," and so forth.

In some embodiments, selecting the first set of one or more keywords includes obtaining first contextual information, for instance, as described with respect to block 902 of FIG. 9A. For example, the first contextual information may include information received from one or more sensors (e.g., cameras, microphones, accelerometers, GPS, etc.), current or recent device context (e.g., device status, application status, status of connected devices, networks, or services, etc.), user data, and so forth. For example, the obtained first contextual information may indicate that the keywords "dictate" and "replace" were recently detected (e.g., indicating that the user is actively interacting with a text entry field), supporting the selection of "dictate," "replace," and/or additional text entry-related keywords (e.g., "delete," "new line," "cut," "copy," etc.) for the first set of keywords.

In some embodiments, the first element of the user interface is selected based on the first contextual information. For example, the first contextual information can be used to determine which elements of the first user interface are relevant and/or likely to be interacted with by the user. In response to selecting the first element of the first user interface, the first keyword corresponding to the first element is selected (e.g., to be activated as part of the first set of keywords). For example, based on contextual information indicating that the user is driving a car, a text input field in a messaging application user interface may be selected (e.g., as the user is likely to invoke method 1300 to provide voice control of the text input field), and in response, the keyword "dictate" is selected for the first set of keywords. On the other hand, an affordance for a video call in the messaging application user interface may not be selected (e.g., as the user is unlikely to invoke a video call while driving), and accordingly, the keywords "call" and/or "FaceTime" corresponding to the video call affordance may not be selected for the first set of keywords.

In some embodiments, the first contextual information used to select the first element of the first user interface includes first attention information (e.g., image data, gaze tracking data, head tracking data, interaction data, etc.) and selecting the first element includes determining, based on the first attention information, that the first element of the first user interface satisfies attention criteria (e.g., determining that the user is likely paying attention to the first element). For example, the attention criteria may be satisfied by determining (e.g., from gaze or head tracking data) that the user is likely looking at or near the first element (e.g., if the first element falls within area 1208, as illustrated in FIG. 12A). As another example, the attention criteria may be satisfied by determining that an attention-getting output, such as a pop-up notification or sound alert, was provided with respect to the first element.

In some embodiments, selecting the first set of one or more keywords includes determining whether at least one action is available for performance with respect to the first element of the first user interface, and, if so, selecting a keyword corresponding to the available action. For example, as illustrated in FIG. 12A, certain functions of the user interface for the messaging application may be made available to invoke with a keyword (e.g., dictating, recording a voice message, navigating between conversations, etc.), while other functions of the user interface may not be made available to invoke with a keyword (e.g., adding visual effects to a text message, reacting to a message, changing a contact group icon). As another example, as illustrated in FIG. 12B, an input either declining or accepting a media file is required before other actions can be taken (e.g., with respect to the "grayed out" messaging user interface), so the keywords "accept" and "decline" may be selected, while keywords corresponding to the temporarily-unavailable actions are not selected.

In some embodiments, in addition to the at least one keyword corresponding to a first user interface element, the first set of keywords includes at least one global keyword. For example, the global keyword may be an "always on" keyword that is active for all user interfaces, such as the keywords "help" or "what can I say?," for receiving assistance with the voice control system (e.g., invoking the output indicating a portion of active keywords corresponding to present user interface elements, so the user can determine what aspects of the user interface they can control).

In some embodiments, method 1300 includes providing an output indicating at least a first portion of the first set of one or more keywords (e.g., indicating currently active keywords to the user). In some embodiments, the output may include a visual output, such as a displayed list of active keywords or a visual indication of user interface elements with corresponding active keywords. In some embodiments, the output may include an audio output, such as a recited list of active keywords or a natural-language voice output with keyword suggestions (e.g., "You can say 'dictate' to write a message"). In some embodiments, the output indicating at least a portion of the first set of one or more keywords may be provided in response to receiving a user input requesting assistance. For example, the user input may be a speech input including an (active) keyword such as "what can I say?," an input (e.g., a touch input, gesture input, button input) selecting a help affordance of a user interface (e.g., a question mark icon or "help" button), or the like.

At block 1306, a speech input is received, and at block 1308, method 1300 determines whether the speech input includes at least one keyword of the first set of one or more keywords. In some embodiments, the determination of whether the speech input includes at least one keyword of the first set of one or more keywords is performed as discussed with respect to blocks 906-908 of FIG. 9A, above. For example, the determination may be made using a first language model, such as a limited-vocabulary ASR system, and without performing full NLP. Accordingly, even in embodiments that include a large-vocabulary speech recognition (LVCSR) system capable of recognizing and understanding relatively unrestricted natural language inputs (e.g., as part of a digital assistant system such as digital assistant system 700), blocks 1306-1308 can be performed without engaging the LVCSR system.

In accordance with a determination that the speech input includes the first keyword of the first set of one or more keywords (i.e., the keyword corresponding to the first element of the first user interface), at block 1310, a first action is caused to be performed with respect to the first element of the first user interface. For example, as illustrated in FIG. 12A, if the active keyword "dictate," corresponding to the text input field element 1206A, is detected, the action of transcribing a dictated message into element 1206A is performed (e.g., using a second language model for text processing, as described below). As another example, as illustrated in FIG. 12B, if the active keyword "accept," corresponding to the affordance element 1214B, is detected, the action of accepting a media file is caused to be performed (e.g., by selecting element 1214B).

In some embodiments, further in accordance with a determination that the speech input includes the first keyword of the first set of one or more keywords, at least one word included in the speech input is determined, for instance, as described with respect to block 910 of FIG. 9A. For example, a second language model, such as a large-vocabulary speech recognition (LVCSR)/NLP system capable of recognizing and understanding relatively unrestricted natural language inputs, is used to interpret a portion of the speech input that does not correspond to an active keyword, such as speech provided following the active keyword "dictate" (e.g., the speech to be transcribed), or a parameter of the first action, such as the workout type "yoga" specified in the input "change workout to yoga." In some embodiments, in accordance with a determination that the speech input includes both the first keyword and a trigger word, an output is provided, indicating that performance of the first action can be caused with the first keyword and without the trigger keyword, for instance, as described with respect to block 910 of FIG. 9A.

On the other hand, in some embodiments, if no keyword of the first set of one or more keywords is detected in the received speech input (e.g., in accordance with a determination that the speech input does not include either the first keyword or another keyword of the first set of keywords), performance of block 1310 is foregone. In some embodiments, in accordance with a determination that the speech input does not include either the first keyword or another keyword of the first set of keywords, and further in accordance with a determination that the speech input includes a trigger word, a digital assistant session is initiated. For example, if the speech input includes the trigger word "Hey Assistant," a digital assistant system including an LVCSR system may be activated to interpret and respond to the instant speech input and/or subsequent speech inputs for the duration of the digital assistant session. In some embodiments, the previously-extracted acoustic features may be passed to the digital assistant system to expedite the digital assistant's interpretation of the non-active keyword speech.

Referring now to FIG. 13B, in some embodiments, at block 1312, second user interface, including at least a second element, is displayed. For example, the second user interface may be an updated version of the first user interface (e.g., a different view of the first user interface, a version of the first interface with different elements and/or functionality available, etc.), or the second user interface may be an entirely different user interface (e.g., a user interface for a different application, a new user interface displayed simultaneously with or superimposed over the first user interface, etc.).

In these embodiments, at block 1314, a second set of one or more keywords, different from the first set of keywords, is selected, including at least a second keyword corresponding to the second element of the second user interface. In some embodiments, block 1314 is performed in response to determining that the second user interface differs from the first user interface. For example, as illustrated in FIGS. 12A-12B, the keywords "accept" and "deny" are selected for the second set of keywords, corresponding to the functionality of the newly-displayed user interface for receiving a media file, while the previously-active keywords "dictate," "open," "record," and "voice message," corresponding to the temporarily deactivated first user interface, are not selected for the second set of keywords. As another example, if a user interface changes display orientation, causing additional elements to be displayed and/or hiding previously-displayed elements, keywords corresponding to the additional elements may be selected for the second set of keywords, while keywords corresponding to elements that are no longer visible may be deactivated.

In these embodiments, at block 1316, a second speech input is received, and at block 1318, a determination is made whether the second speech input includes at least one keyword of the second set of one or more keywords. For example, block 1318 may be performed as generally described with respect to block 1308, but with respect to the second set of keywords (e.g., the updated, currently-active set of keywords) rather than the first set of keywords (e.g., the previously-active set of keywords). In these embodiments, at block 1320, in accordance with a determination that the second speech input includes the second keyword of the second set of one or more keywords (e.g., the keyword corresponding to the second element of the second user interface), a second action is caused to be performed with respect to the second element of the second user interface. On the other hand, if a determination is made that the received second speech input does not include at least one keyword of the second set of one or more keywords-even if the user did utter an inactive keyword-a second action is not caused to be performed.

The method described above with reference to FIGS. 13A-13B are optionally implemented by components depicted in FIGS. 1-4, 6A-6B, 7A-7C, and 12A-12B. For example, the operations of method 900 may be implemented by one or more electronic devices (e.g., 104, 122, 200, 400, 600, 1202), such as one implementing system 700. For example, the operations of method 1300 may be implemented using a cell phone, tablet, laptop, smart TV, smart speaker, smart watch, headset, smart glasses, and/or the like. It would be clear to a person having ordinary skill in the art how other processes are implemented based on the components depicted in FIGS. 1-4, 6A-6B, 7A-7C, and 12A-12B.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the selection of active keywords that are relevant and/or likely to be invoked by a user. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to intelligently select keywords that are relevant and/or likely to be invoked by a user. Accordingly, use of such personal information data provides an efficient voice control system with keywords tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of using personal information for the selection of keywords, the present technology can be configured to allow users to select to "opt in" or "opt out" of participation in the collection of personal information data during registration for services or anytime thereafter. In another example, users can select not to provide mood-associated data for use in selecting keywords to activate. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, keywords can be intelligently selected to activate based on non-personal information data or a bare minimum amount of personal information, such as the content being requested by the device associated with a user, other non-personal information available to the keyword voice control system, or publicly available information.

What is claimed is:

1. An electronic device, comprising:
one or more processors;
a memory; and
one or more programs, wherein the one or more programs are stored in the memory and configured to be executed by the one or more processors, the one or more programs including instructions for:
  obtaining first contextual information;
  selecting, based on the first contextual information, a first set of one or more keywords, wherein selecting the first set of one or more keywords includes:
    determining, based on the first contextual information, a first action that is available for performance; and
    in response to determining the first action, selecting a first keyword for the first set of one or more keywords, wherein the first keyword corresponds to the first action;

receiving a speech input;
  determining whether the speech input includes at least one keyword of the first set of one or more keywords; and
  in response to determining that the speech input includes at least one keyword of the first set of one or more keywords, performing a first an action that corresponds to the at least one keyword.

2. The electronic device of claim 1, wherein obtaining the first contextual information includes receiving at least a first portion of the first contextual information from one or more sensors.

3. The electronic device of claim 1, wherein the first contextual information includes current device context.

4. The electronic device of claim 3, wherein the current device context includes user interface information.

5. The electronic device of claim 3, wherein the current device context includes application information.

6. The electronic device of claim 1, wherein the first contextual information includes user data.

7. The electronic device of claim 1, wherein selecting the first set of one or more keywords includes:
selecting a respective keyword of the first set of one or more keywords from a plurality of keywords.

8. The electronic device of claim 7, the one or more programs including instructions for:
prior to selecting the first set of one or more keywords:
  receiving a natural-language speech input directed to a digital assistant, wherein the natural-language speech input includes a request to perform a third action; and
  in accordance with a determination that the natural-language speech input satisfies keyword criteria, adding a candidate keyword to the plurality of keywords, wherein the candidate keyword corresponds to at least a portion of the natural-language speech input.

9. The electronic device of claim 7, wherein at least one keyword of the plurality of keywords is obtained from an application.

10. The electronic device of claim 1, wherein determining, based on the first contextual information, the first action that is available for performance includes:
determining whether the first action satisfies attention criteria.

11. The electronic device of claim 1, the one or more programs including instructions for:
obtaining second contextual information;
selecting, based on the second contextual information, a second set of one or more keywords different from the first set of one or more keywords;
receiving a second speech input;
determining whether the second speech input includes at least one keyword of the second set of one or more keywords; and
in accordance with a determination that the speech input includes at least one keyword of the second set of one or more keywords, performing a second action.

12. The electronic device of claim 11, wherein selecting the second set of one or more keywords in accordance with a determination that the second contextual information differs from the first contextual information.

13. The electronic device of claim 1, the one or more programs including instructions for:
providing an output indicating at least a first portion of the first set of one or more keywords.

14. The electronic device of claim 1, the one or more programs including instructions for:

in accordance with a determination that the speech input includes a trigger word in addition to the at least one keyword of the first set of one or more keywords, providing an output indicating that performance of the action can be caused with the at least one keyword and without the trigger word.

15. The electronic device of claim 1, wherein determining whether the speech input includes at least one keyword of the first set of one or more keywords includes:

extracting a set of acoustic features from the speech input.

16. The electronic device of claim 15, wherein determining whether the speech input includes at least one keyword of the first set of one or more keywords includes:

determining, based on the set of acoustic features, a confidence score representing a likelihood that the speech input includes the at least one keyword; and determining whether the confidence score satisfies confidence criteria.

17. The electronic device of claim 1, wherein determining whether the speech input includes at least one keyword of the first set of one or more keywords is performed using a first language model.

18. The electronic device of claim 1, the one or more programs including instructions for:

in accordance with a determination that the speech input does not include at least one keyword of the first set of one or more keywords, forgoing performance of the action.

19. The electronic device of claim 1, wherein performing the action includes:

determining, using a second language model, at least one word included in the speech input.

20. The electronic device of claim 19, wherein the at least one keyword included in the speech input corresponds to a first portion of the speech input; and wherein determining, using the second language model, the at least one word included in the speech input is performed in accordance with a determination that the speech input includes a second portion not corresponding to at least one keyword of the first set of one or more keywords.

21. A method, comprising:

at an electronic device with one or more processors and memory:

obtaining first contextual information;

selecting, based on the first contextual information, a first set of one or more keywords, wherein selecting the first set of one or more keywords includes:

determining, based on the first contextual information, a first action that is available for performance; and in response to determining the first action, selecting a first keyword for the first set of one or more keywords, wherein the first keyword corresponds to the first action;

receiving a speech input;

determining whether the speech input includes at least one keyword of the first set of one or more keywords; and in response to determining that the speech input includes at least one keyword of the first set of one or more keywords, performing a first an action that corresponds to the at least one keyword.

22. The method of claim 21, wherein obtaining the first contextual information includes receiving at least a first portion of the first contextual information from one or more sensors.

23. The method of claim 21, wherein the first contextual information includes current device context.

24. The method of claim 23, wherein the current device context includes user interface information.

25. The method of claim 23, wherein the current device context includes application information.

26. The method of claim 21, wherein the first contextual information includes user data.

27. The method of claim 21, wherein selecting the first set of one or more keywords includes:

selecting a respective keyword of the first set of one or more keywords from a plurality of keywords.

28. The method of claim 27, further comprising:

prior to selecting the first set of one or more keywords:

receiving a natural-language speech input directed to a digital assistant, wherein the natural-language speech input includes a request to perform a third action; and in accordance with a determination that the natural-language speech input satisfies keyword criteria, adding a candidate keyword to the plurality of keywords, wherein the candidate keyword corresponds to at least a portion of the natural-language speech input.

29. The method of claim 27, wherein at least one keyword of the plurality of keywords is obtained from an application.

30. The method of claim 21, wherein determining, based on the first contextual information, the first action that is available for performance includes:

determining whether the first action satisfies attention criteria.

31. The method of claim 21, further comprising:

in accordance with a determination that the speech input does not include at least one keyword of the first set of one or more keywords, forgoing performance of the action.

32. A non-transitory computer-readable storage medium storing one or more programs, the one or more programs comprising instructions, which when executed by one or more processors of a first electronic device, cause the first electronic device to:

obtain first contextual information;

select, based on the first contextual information, a first set of one or more keywords, wherein selecting the first set of one or more keywords includes:

determining, based on the first contextual information, a first action that is available for performance; and in response to determining the first action, selecting a first keyword for the first set of one or more keywords, wherein the first keyword corresponds to the first action;

receive a speech input;

determine whether the speech input includes at least one keyword of the first set of one or more keywords; and in response to determining that the speech input includes at least one keyword of the first set of one or more keywords, perform an action that corresponds to the at least one keyword.

33. The non-transitory computer-readable storage medium of claim 32, wherein obtaining the first contextual information includes receiving at least a first portion of the first contextual information from one or more sensors.

34. The non-transitory computer-readable storage medium of claim 32, wherein the first contextual information includes current device context.

35. The non-transitory computer-readable storage medium of claim 34, wherein the current device context includes user interface information.

36. The non-transitory computer-readable storage medium of claim 34, wherein the current device context includes application information.

37. The non-transitory computer-readable storage medium of claim 32, wherein the first contextual information includes user data.

38. The non-transitory computer-readable storage medium of claim 32, wherein selecting the first set of one or more keywords includes:

selecting a respective keyword of the first set of one or more keywords from a plurality of keywords.

39. The non-transitory computer-readable storage medium of claim 38, the one or more programs further including instructions for:

prior to selecting the first set of one or more keywords:

receiving a natural-language speech input directed to a digital assistant, wherein the natural-language speech input includes a request to perform a third action; and in accordance with a determination that the natural-language speech input satisfies keyword criteria, adding a candidate keyword to the plurality of keywords, wherein the candidate keyword corresponds to at least a portion of the natural-language speech input.

40. The non-transitory computer-readable storage medium of claim 38, wherein at least one keyword of the plurality of keywords is obtained from an application.

41. The non-transitory computer-readable storage medium of claim 32, wherein determining, based on the first contextual information, the first action that is available for performance includes:

determining whether the first action satisfies attention criteria.

42. The non-transitory computer-readable storage medium of claim 32, the one or more programs further including instructions for:

in accordance with a determination that the speech input does not include at least one keyword of the first set of one or more keywords, forgoing performance of the action.

* * * * *